United States Patent
Okada et al.

[11] Patent Number: 5,973,836
[45] Date of Patent: Oct. 26, 1999

[54] OPTICAL SYSTEM HAVING AN OPTICAL SYSTEM SHAKE COMPENSATING FUNCTION

[75] Inventors: Takashi Okada, Osaka; Kohtaro Hayashi, Toyonaka, both of Japan

[73] Assignee: Minolta Co., Ltd., Osaka, Japan

[21] Appl. No.: 08/543,075

[22] Filed: Oct. 13, 1995

[30] Foreign Application Priority Data

Oct. 14, 1994 [JP] Japan .................................. 6-249104

[51] Int. Cl.$^6$ .............................. G02B 27/64; G02B 3/02
[52] U.S. Cl. ........................................... 359/557; 359/708
[58] Field of Search .................................. 359/557, 708, 359/687, 773, 554

[56] References Cited

U.S. PATENT DOCUMENTS

| | | |
|---|---|---|
| 4,518,229 | 5/1985 | Yasukuni . |
| 4,907,868 | 3/1990 | Kitagishi et al. . |
| 5,000,549 | 3/1991 | Yamazaki ................................ 359/557 |
| 5,121,978 | 6/1992 | Maruyama ............................. 359/557 |
| 5,168,403 | 12/1992 | Umeda et al. ........................... 359/692 |
| 5,170,292 | 12/1992 | Yamanashi ............................. 359/686 |
| 5,249,079 | 9/1993 | Umeda ................................... 359/554 |
| 5,270,857 | 12/1993 | Oizumi et al. . |
| 5,376,993 | 12/1994 | Kubota et al. .......................... 354/430 |
| 5,418,646 | 5/1995 | Shibata et al. ......................... 359/687 |
| 5,442,486 | 8/1995 | Sato ....................................... 359/690 |
| 5,539,576 | 7/1996 | Ito .......................................... 359/557 |
| 5,579,171 | 11/1996 | Suzuki et al. .......................... 359/687 |

FOREIGN PATENT DOCUMENTS

| | | |
|---|---|---|
| 0 590 950 A3 | 4/1994 | European Pat. Off. . |
| 0592916A1 | 4/1994 | European Pat. Off. . |
| 01197713 | 8/1989 | Japan . |
| 05232410 | 9/1993 | Japan . |
| 06075192 | 3/1994 | Japan . |
| 6-123836 | 5/1994 | Japan . |

*Primary Examiner*—Cassandra Spyrou
*Assistant Examiner*—Mark A. Robinson
*Attorney, Agent, or Firm*—Burns, Doane, Swecker & Mathis, LLP

[57] ABSTRACT

A system includes a compensating lens unit capable of decentering for camera shake compensation and a non-decentering lens located closer to an image than the compensating lens unit and not decentering in camera shake compensation. An aspherical surface is formed in the compensating lens unit, and an aspherical surface which tends to counteract an aspherical effect of the aspherical surface formed in the compensating lens unit is formed in the non-decentering lens.

18 Claims, 43 Drawing Sheets

FNO=4.60

—— d
----- SC

-0.5   0.5
SPHERICAL   SINE
ABERRATION  CONDITION

Y'=21.6

----- DM
—— DS

-0.5   0.5
ASTIGMATISM

Y'=21.6

-4.0   4.0
DISTORTION %

FNO=5.80

—— d
----- SC

-0.5   0.5
SPHERICAL   SINE
ABERRATION  CONDITION

Y'=21.6

----- DM
—— DS

-0.5   0.5
ASTIGMATISM

Y'=21.6

-4.0   4.0
DISTORTION %

Y'=15

Y'=0

FNO=6.20

— d
----- SC

SPHERICAL    SINE
ABERRATION   CONDITION

Y'=21.6

----- DM
— DS

ASTIGMATISM

Y'=21.6

DISTORTION %

FNO=4.70

— d
----- SC

SPHERICAL    SINE
ABERRATION   CONDITION

Y'=21.6

----- DM
— DS

ASTIGMATISM

Y'=21.6

DISTORTION %

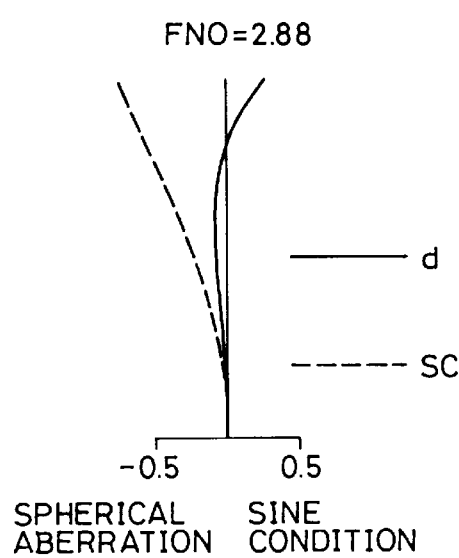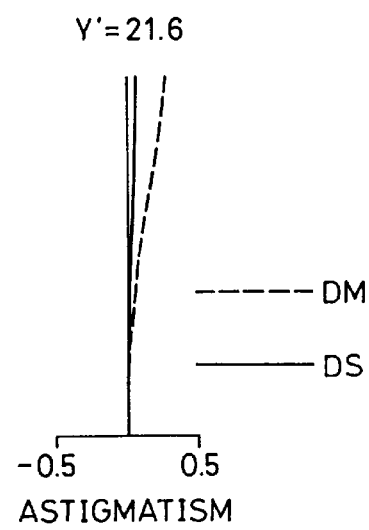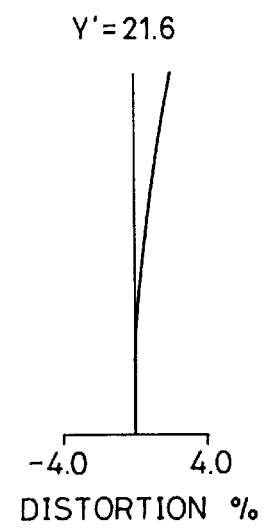

OPTICAL SYSTEM HAVING AN OPTICAL SYSTEM SHAKE COMPENSATING FUNCTION

BACKGROUND OF THE INVENTION

1. Field of the Invention

The present invention relates to an optical system having camera shake compensating function, and more specifically, to an optical system (e.g. zoom lens system, fixed focal length lens system) having a camera shake compensating function capable of preventing image blur due to camera shake (e.g. shake of the camera caused when the user holds the camera to perform photographing).

2. Description of the Prior Art

Conventionally, the failure in photographing was mostly attributed to camera shake and being out of focus. In recent years, however, most cameras employ the automatic focusing mechanism and with the improvement of focusing accuracy of the automatic focusing mechanism, the problem of the failure in photographing due to being out of focus has been practically solved. On the other hand, the lens system normally incorporated in the camera has shifted from a fixed focal length lens system to a zoom lens system, and with the shift, the magnification and the longest focal length have been increased. Consequently, camera shake very frequently occurs. As a result, presently, it is no exaggeration to say that the failure in photographing is caused by camera shake. For this reason, a camera shake compensating function is indispensable for the lens system (particularly, zoom lens system).

As optical systems having a camera shake compensating function, optical systems have been proposed in which camera shake is compensated for by decentering a part of the lenses (hereinafter, this type of optical system will be referred to as "camera shake compensating optical system"). For example, Japanese Laid-open Patent Application No. H6-123836 discloses a five unit zoom lens system of positive, negative, negative, positive, negative configuration in which camera shake compensation is made by decentering the negative third lens unit. This five unit zoom lens system is based on a four unit telephoto zoom lens system having positive, negative, positive, negative configuration and the negative second lens unit is divided into two negative lens units. The five unit zoom lens system is compact as a whole since it is based on the four unit system of positive, negative, positive, negative configuration.

In the camera shake compensating optical system, not only optical performance is necessarily excellent in the normal condition (i.e. "pre-decentering condition") but also the generation of aberrations due to the decentering of the lens is necessarily restrained to maintain desired optical performance in the compensated condition (i.e. "post-decentering condition").

However, the five unit zoom lens system of Japanese Laid-open Patent Application No. H6-123836 has a problem that the aberration performance after the camera shake compensation (i.e. after decentering) is inferior. Although Japanese Laid-open Patent Application No. H6-123836 positively appraises the performance of the system at an angle of compensation of approximately 0.15°, when the compensation angle is greater, the aberration degradation is impermissible.

In particular, axial coma, which is generated in proportion to the third power of the focal length, increases with an increase in focal length. That is, in a normal telephoto zoom lens system for use in a single-lens reflex camera, the focal length is 120 mm or more (corresponding to a half angle of view of 10° or less) on the longer focal length side in 35 mm format and the minimum F-number is approximately 6.7 or less. When a camera shake compensating system is incorporated therein, since axial coma is proportional to the third power of the focal length and inversely proportional to the second power of the F-number, if the telephoto zoom lens system is provided with a camera shake compensating function, axial coma is very great, so that it is very difficult to excellently correct aberrations (i.e. aberrations including axial coma) with good balance in the entire zoom range.

If a lens unit capable of decentering is added as the first lens unit, aberration performance such as off-axial image point movement error, one-side blur and axial coma after the camera shake compensation can be excellently corrected in the entire zoom range. However, since the first lens unit has a large diameter, a driving mechanism for decentering it should be large. This increases the size of the lens barrel.

SUMMARY OF THE INVENTION

An object of the present invention is to provide a compact optical system having a camera shake compensating function, capable of excellently correcting aberrations both in the normal condition and in the compensated condition.

BRIEF DESCRIPTION OF THE DRAWINGS

This and other objects and features of this invention will become clear from the following description, taken in conjunction with the preferred embodiments with reference to the accompanied drawings in which:

FIGS. 22A to 22C show longitudinal aberrations of the third embodiment before decentering;

DESCRIPTION OF THE PREFERRED EMBODIMENTS

Figure 1:
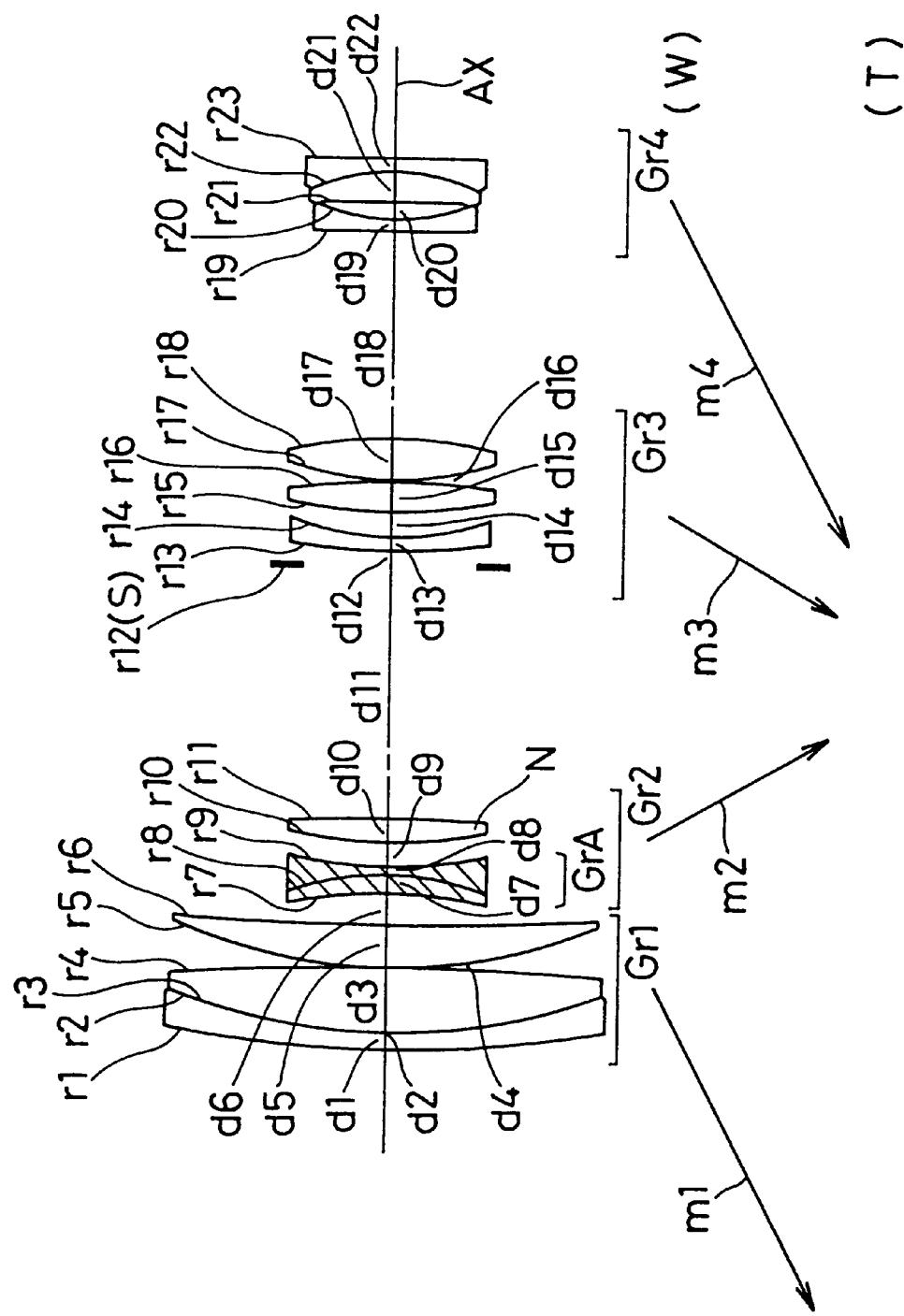
FIG. 1 shows the lens arrangement of a first embodiment of the present invention.
Figure 2A:
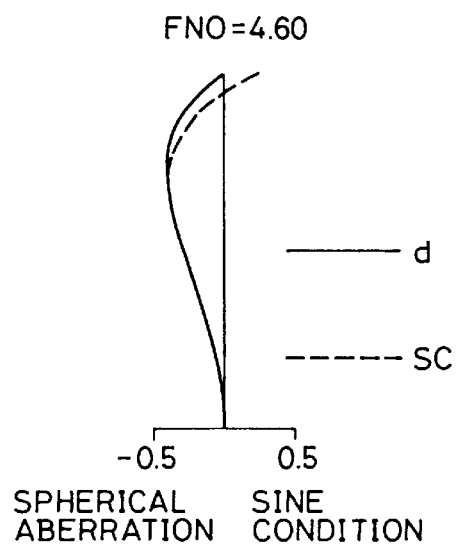
FIGS. 2A to 2C show longitudinal aberrations of the first embodiment before decentering at the shortest focal length condition.
Figure 2B:
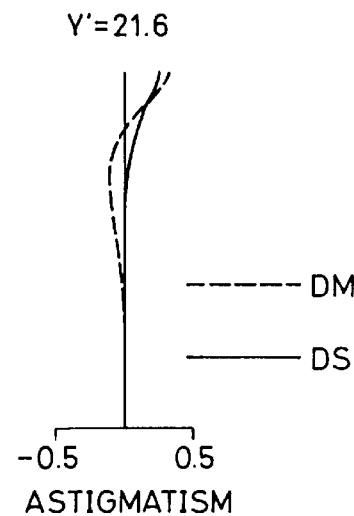
Figure 2C:
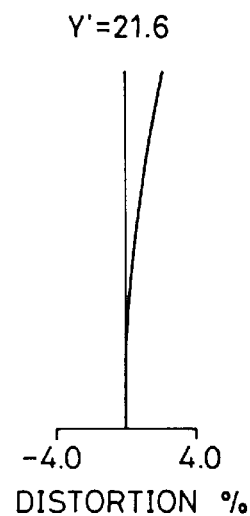
Figure 2D:
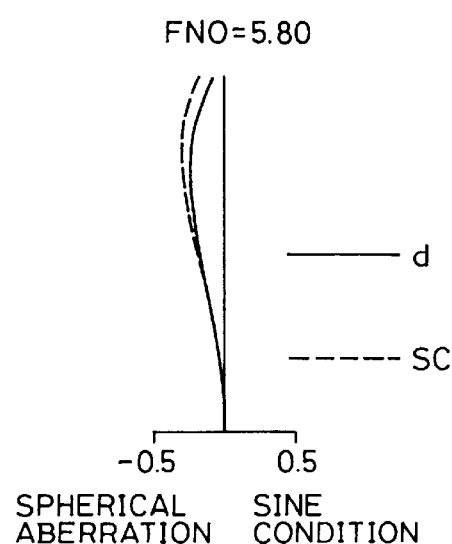
FIGS. 2D to 2F show longitudinal aberrations of the first embodiment before decentering at the longest focal length condition.
Figure 2E:
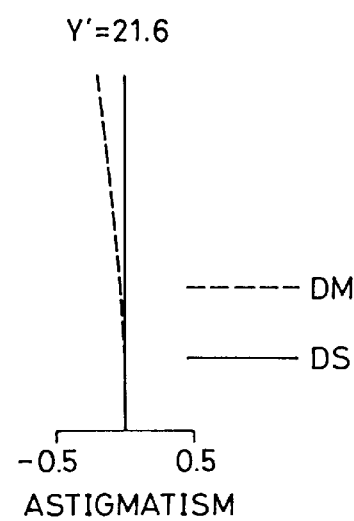
Figure 2F:
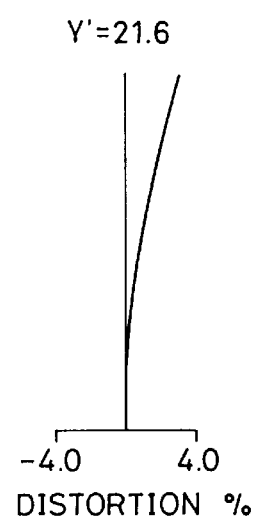
Figure 3A:
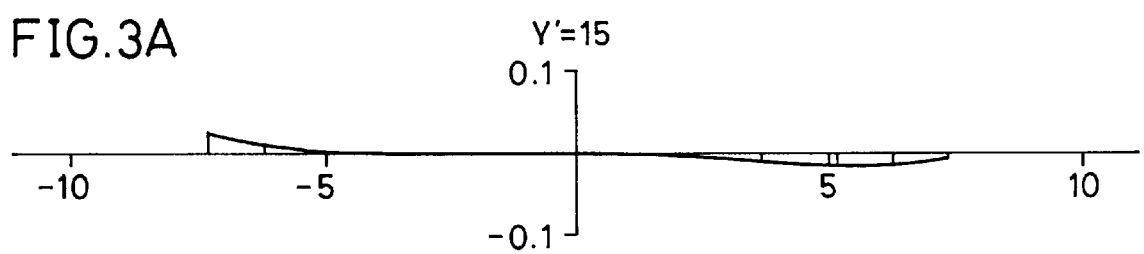
FIGS. 3A and 3B show meridional lateral aberrations of the first embodiment at the shortest focal length condition before decentering.
Figure 3B:
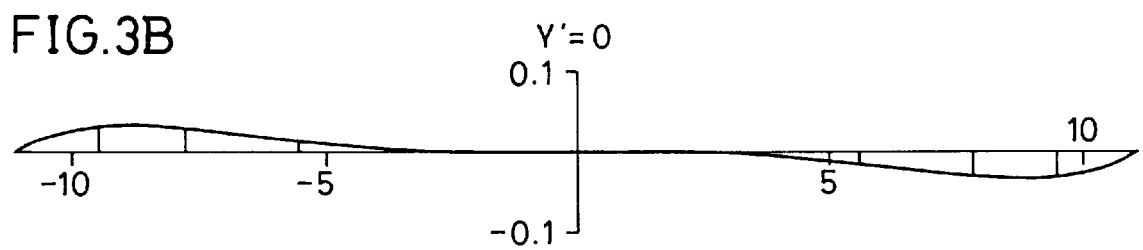
Figure 4A:
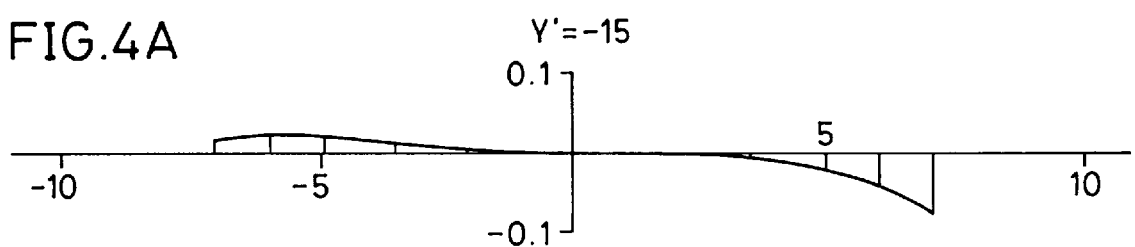
FIGS. 4A to 4C show meridional lateral aberrations of the first embodiment at the shortest focal length condition after decentering.
Figure 4B:
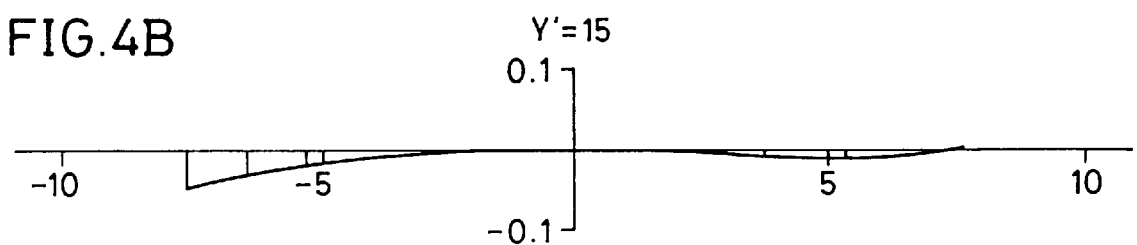
Figure 4C:
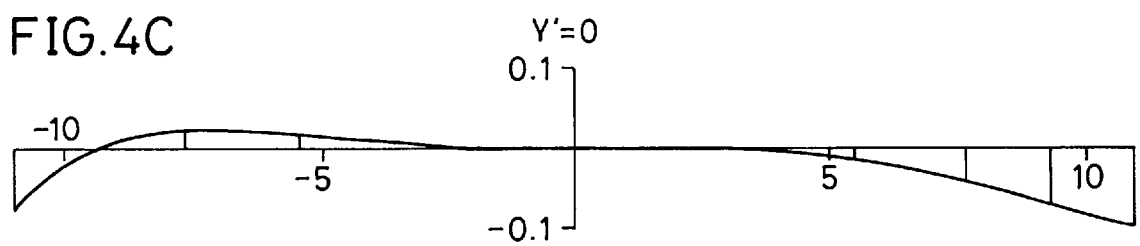
Figure 5A:
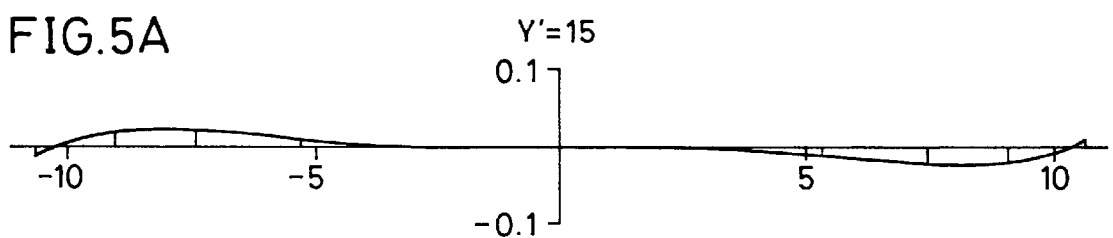
FIGS. 5A and 5B show sagittal lateral aberrations of the first embodiment at the shortest focal length condition before decentering.
Figure 5B:
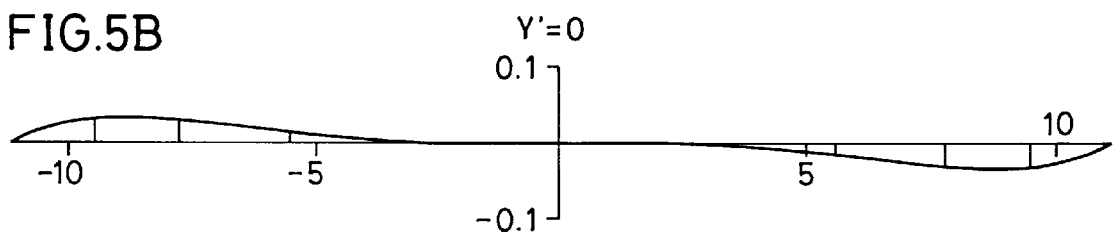
Figure 6A:
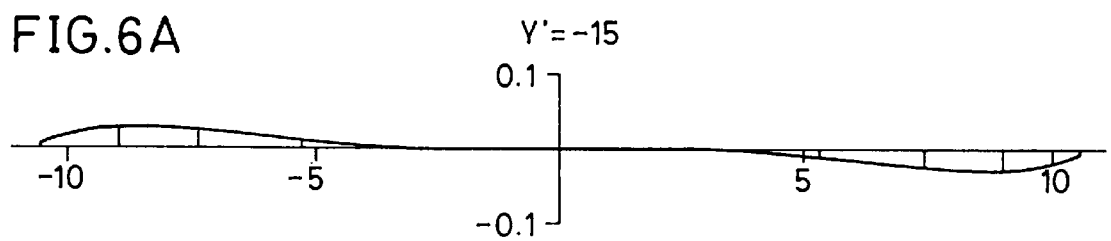
FIGS. 6A to 6C show sagittal lateral aberrations of the first embodiment at the shortest focal length condition after decentering.
Figure 6B:
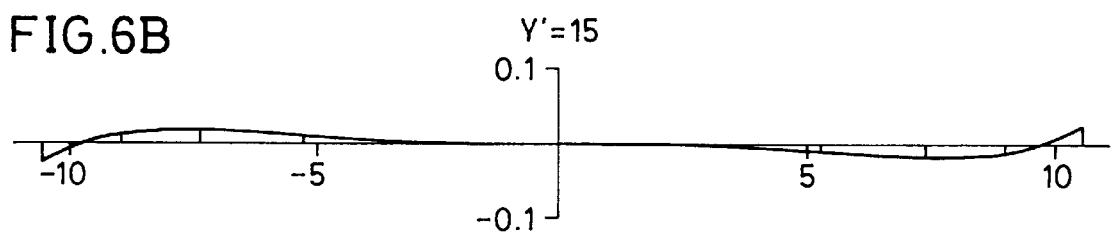
Figure 6C:
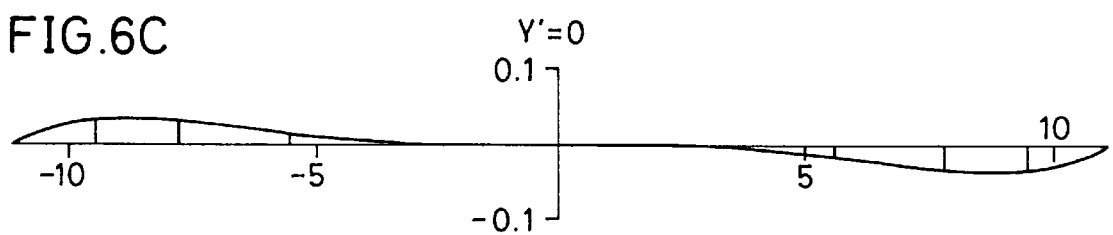
Figure 7A:
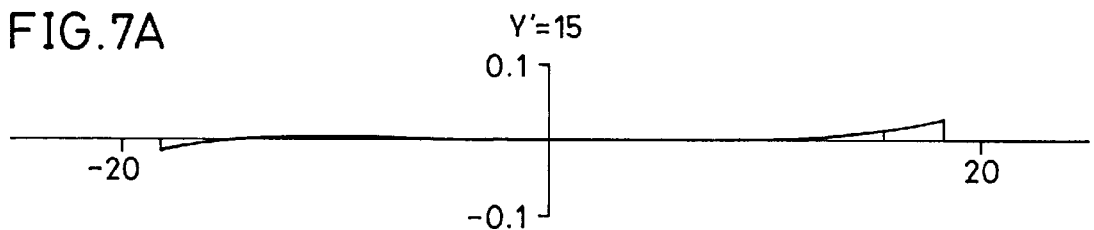
FIGS. 7A to 7B show meridional lateral aberrations of the first embodiment at the longest focal length condition before decentering.
Figure 7B:
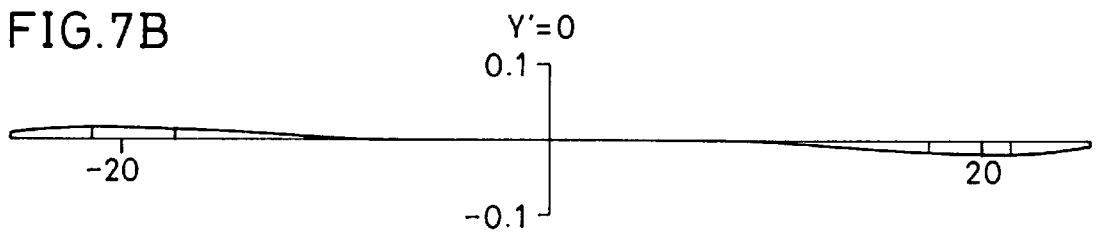
Figure 8A:
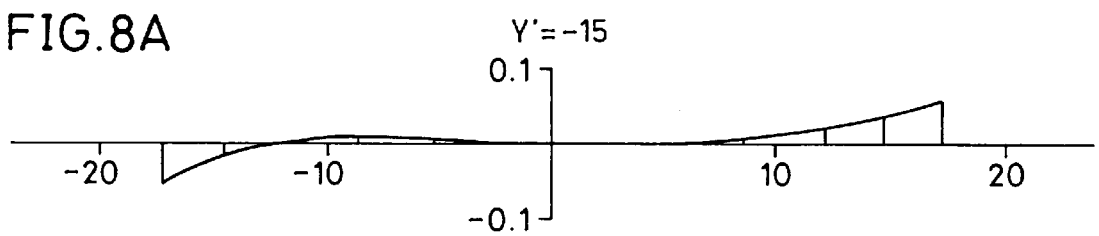
FIGS. 8A to 8C show meridional lateral aberrations of the first embodiment at the longest focal length condition after decentering.
Figure 8B:
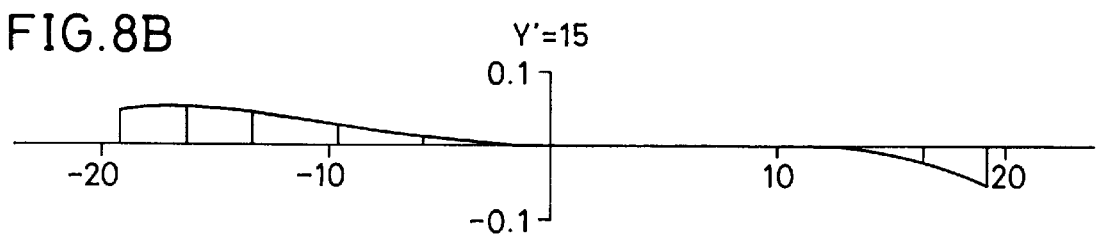
Figure 8C:
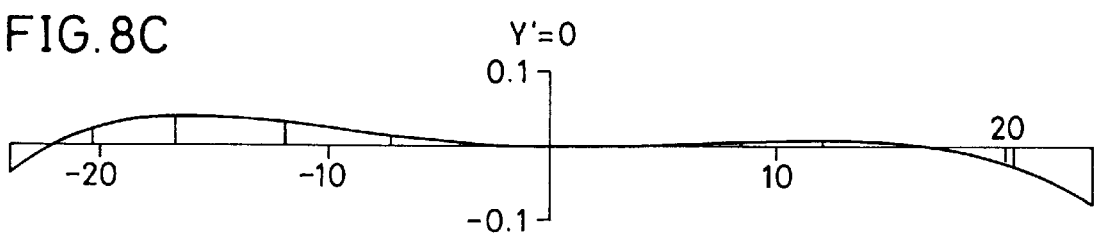
Figure 9A:
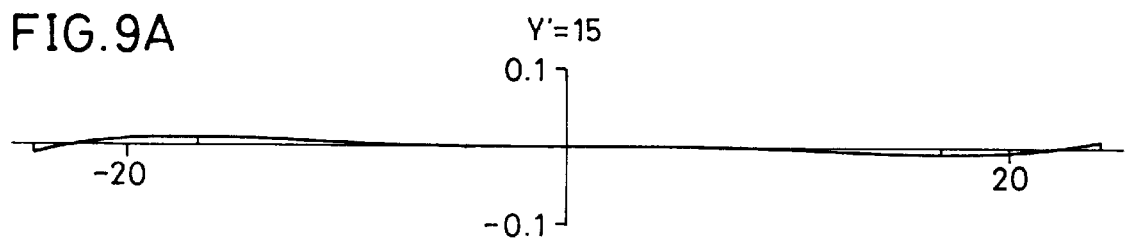
FIGS. 9A and 9B show sagittal lateral aberrations of the first embodiment at the longest focal length condition before decentering.
Figure 9B:
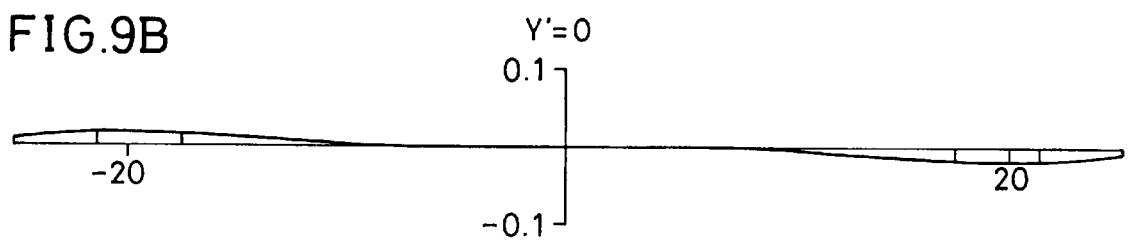
Figure 10A:
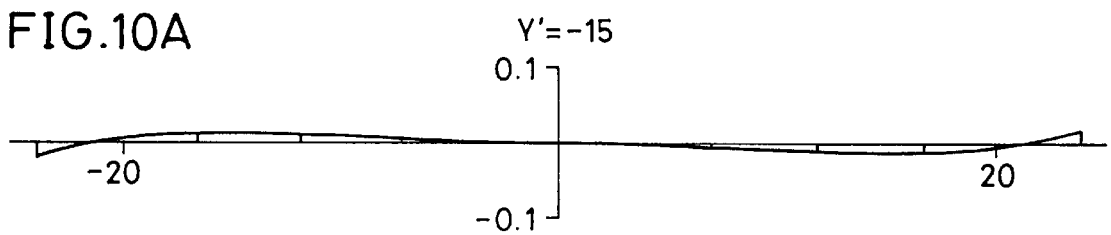
FIGS. 10A to 10C show sagittal lateral aberrations of the first embodiment at the longest focal length condition after decentering.
Figure 10B:
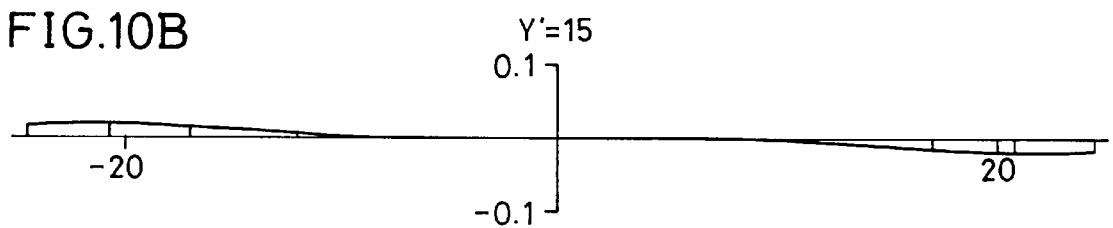
Figure 10C:
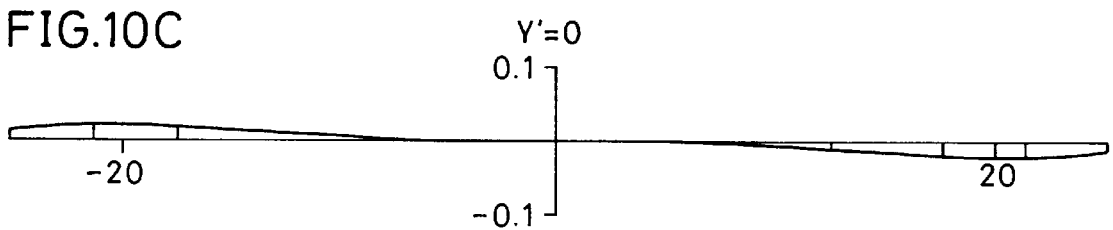

An optical system having a camera shake compensating function according to a first implementation comprises a compensating lens unit capable of decentering for camera shake compensation, a lens located closer to an image than the compensating lens unit and not decentering in camera shake compensation, and an aperture. In the compensating lens unit, an aspherical surface is formed. In the lens not decentering in camera shake compensation, an aspherical surface which tends to counteract an aspherical effect of the aspherical surface of the compensating lens unit is formed. The following conditions (1) and (2) are fulfilled:

$$\omega \le 10°  \quad (1)$$

$$\frac{D}{f} \le 0.3 \quad (2)$$

where $\omega$ is a half angle of view, D is a distance from the aperture stop to the decentering lens unit, and f is a focal length of the entire lens system.

An optical system having a camera shake compensating function according to a second implementation comprises a plurality of lens units and performs zooming by varying the distances between the lens units. The following are included: a compensating lens unit located in a lens unit other than the most object side lens unit and capable of decentering for camera shake compensation; and a lens located closer to the image than the compensating lens unit. In the compensating lens unit, an aspherical surface is formed. In the lens not decentering in camera shake compensation, an aspherical surface which tends to counteract an aspherical effect of the aspherical surface of the compensating lens unit is formed.

As previously mentioned, in a lens system having a half angle of view of approximately 10° or less (i.e. a telephoto lens system having a focal length f of 120 mm or more in 35 mm format) and an F-number smaller than 6.7, axial coma is very large as is apparent from subsequently-shown expressions of aberration coefficients of camera shake compensating optical systems. For example, in a four unit zoom lens system of positive, negative, positive, negative configuration where aberrations generated in the normal condition are excellently corrected, if the second lens unit or a part of the second lens unit is used as the decentering lens unit (i.e. compensating lens unit), of the decentering aberrations, axial coma is particularly largely generated in camera shake compensation. It is apparent from the subsequently-shown expressions of aberration coefficients that the largest reason for the generation of axial coma is (the term of) spherical aberration of the decentering lens unit. Therefore, by using an aspherical surface as one surface of the decentering lens unit as described above, spherical aberration of the decentering lens unit can be excellently corrected. As a result, the decentering aberrations in camera shake compensation can be all corrected excellently. However, in the normal condition, the balance of aberrations of the entire lens system is broken by the aspherical surface of the decentering lens unit and spherical aberration is particularly large.

In the optical systems having a camera shake compensating function according to the first and second implementations, an aspherical surface which tends to counteract the aspherical effect of the aspherical surface of the decentering lens unit is formed in a lens located closer to the image than the decentering lens unit and not decentering in camera shake compensation so that the effects of the aspherical surfaces (hereinafter referred to as "two aspherical surfaces") counteract each other. Consequently, while the aberrations of the entire lens system is returned to excellent condition and the aberration balance is maintained excellent in the normal condition, axial coma is restrained to be small and the decentering aberrations can be excellently corrected in camera shake compensation.

The "aspherical surface which tends to counteract the aspherical effect of the aspherical surface of the decentering lens unit" will be described. For example, when the aspherical surface of the decentering lens unit (i.e. compensating lens unit) is a surface whose object side is glass and whose image side is air and the displacement direction of the aspherical surface relative to a reference spherical surface is a direction such that the aspherical surface displaces toward the object side from the optical axis to the edge along the height, the aspherical surface formed in the lens not decentering in camera shake compensation displaces toward the image side when its object side is glass and its image side is air and displaces toward the object side when its object side is air and its object side is glass. That is, the "aspherical surface which tends to counteract the aspherical effect of the aspherical surface of the decentering lens unit" is an aspherical surface which counteracts the aspherical effect of the other aspherical surface when one aspherical surface is a positive aspherical surface and the other aspherical surface is a negative aspherical surface and when the refractive index, the displacement direction of the aspherical surface and the type of the aspherical surface are decided as shown in Table 1.

Since the aspherical surface of the compensating lens unit and the aspherical surface of the lens not decentering in camera shake compensation should be as close to each other as possible in order that their effects excellently counteract each other, a distance $d_{ASP}$ between the two aspherical surfaces preferably fulfills the following condition (3). In addition, the lenses including the two aspherical surfaces are preferably arranged to adjoin each other.

$$d_{ASP} < 0.1 \times f_T \tag{3}$$

where $d_{ASP}$ is the distance between the two aspherical surfaces and $f_T$ is a focal length of the entire lens system at the longest focal length condition.

Since it is difficult to excellently correct aberrations on both the longer and shorter focal length sides if the distance $d_{ASP}$ between the two aspherical surfaces is largely varied during zooming, it is preferable that the distance $d_{ASP}$ is not varied or that, if it is varied, the variation amount $\Delta d_{ASP}$ fulfills the following condition (4):

$$\Delta d_{ASP} < 0.08 \times f_T \tag{4}$$

$\Delta d_{ASP}$ is a displacement amount of the distance between the two aspherical surfaces.

The conditions (1) and (2) will be explained. The condition (1) means that the half angle of view $\omega$ of the camera shake compensating optical system is 10° or less. The condition (2) means that the compensating lens unit is arranged within $\pm 0.3 \times f$ in the front or the rear of the aperture stop.

In a (standard to wide angle) compensating optical system exceeding the limit of the condition (1), as is apparent from the subsequently-shown expressions of aberration coefficients of camera shake compensating optical systems, axial coma which is proportional to the third power of the focal length is not conspicuous and instead, off-axial image point movement error which is inversely proportional to the focal length is large. In such a camera shake compensating optical system exceeding the limit of the condition (1), if the compensating lens unit is arranged close to the aperture stop (i.e. if the condition (2) is fulfilled), off-axial principal ray passes the compensating lens unit at a position very close to the optical axis. Therefore, in this case, even if the curvature of a surface of the compensating lens unit is changed or an aspherical surface is added, the characteristic of the off-axial ray is not changed very much, so that the off-axial image point movement error remains large and is hardly improved.

The normal telephoto lens system employs a telephoto type structure in which the entire lens system is roughly divided into a positive front lens unit and a negative rear lens unit. The telephoto lens system of this type is characterized in that the total length is shorter than the focal length f and that when the aperture stop is arranged in the negative rear lens unit, the diameters of the negative rear lens unit and the aperture stop are small. However, since the diameter of the positive front lens unit is very large compared to that of the negative rear lens unit, if the compensating lens unit is arranged in the positive front lens unit, a driving mechanism for decentering a large lens unit is necessary. As a result, the diameter of the lens barrel increases as a whole. Therefore, the compensating lens unit is preferably arranged close to the aperture stop having a small diameter.

In view of this, by arranging the compensating optical system which fulfills the condition (1) so as to further fulfill the condition (2), the weight and size of the compensating lens unit can be reduced. Then, since it is unnecessary for the driving mechanism to have a great power, the size of the entire lens barrel can be reduced. Conversely, if the limit of the condition (2) is exceeded (i.e. if the compensating lens is away from the aperture stop by 0.3×f or more) in the lens system fulfilling the condition (1), the diameter of the compensating lens unit increases, so that the size of the entire lens barrel increases.

Subsequently, a definition of aberration degradation in a camera shake compensating optical system like that of the present invention will be described with reference to FIGS. 39A to 39D. The decentering aberrations (off-axial image point movement error, one-side blur, axial coma and axial lateral chromatic aberration) shown in the figures cause the image degradation of the camera shake compensating optical system.

Figure 39A:
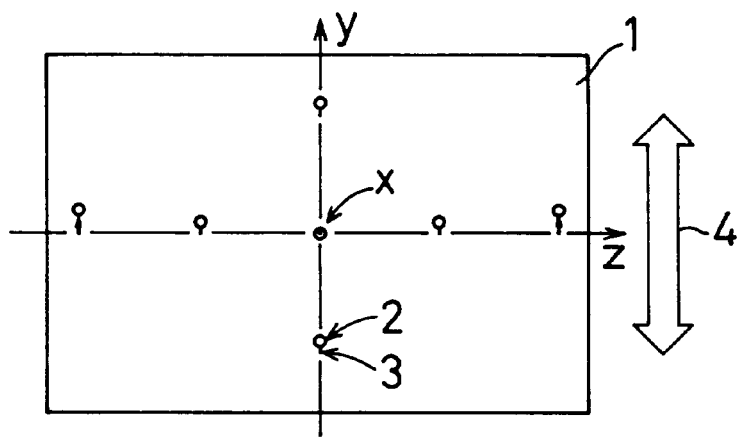
FIGS. 39A to 39D are views of assistance in explaining the factors of image degradation of the camera shake compensating optical system.

Off-axial image point movement error {FIG. 39A}

In a decentered optical system, a distortion due to the decentering is generated in addition to the normal distortion. For this reason, in a camera shake compensating optical system, when camera shake is compensated for so that the axial (in the center of the image plane) image point completely stops, the off-axial image point does not completely stop to cause an image blur. In FIG. 39A, reference numeral 1 represents a film plane, reference numeral 2 represents an image point in the compensated condition (post-decentering condition), reference numeral 3 represents an image point in the standard condition (pre-decentering condition), and reference numeral 4 represents a direction of camera shake compensation.

When the optical axis is along the X-axis, the camera shake direction is along the Y-axis (i.e. a camera shake compensation direction 4 is also along the Y-axis) and Y(y', z', θ') is a Y coordinate (always y(0, 0, θ)=0 since camera shake is compensated for so that the axial image point completely stops) of the actual image point of a light beam with a paraxial image point (y', z') at a compensation angle θ, the following expression (a) holds:

$$\Delta Y(y', z', \theta) = Y(y', z', \theta) - Y(y', z', 0) \quad (a)$$

Unless specifically indicated, an off-axial image point movement error $\Delta Y_{Y}'$ with respect to the image point on the Y-axis and an off-axial image point movement error $\Delta Y_{Z}'$ with respect to the image point on the Z-axis are represented by the following expressions (b) and (c):

$$\Delta Y_{Y}' = \{\Delta Y(0.7\text{field}, 0, 0.7°) + \Delta Y(-0.7\text{field}, 0, 0.7°)\}/2 \quad (b)$$

$$\Delta Y_{Z}' = \Delta Y(0, 0.7\text{field}, 0.7°) \quad (c)$$

where 0.7field is approximately 15 mm in 35 mm film.

Figure 39B:
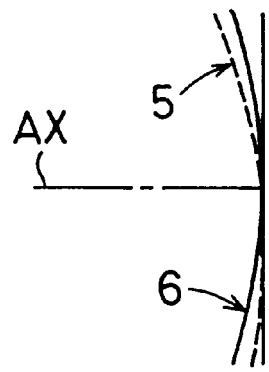

One-side blur {FIG. 39B}

Referring to FIG. 39B, reference numeral 5 represents an image plane which is asymmetric with respect to an optical axis AX, and reference numeral 6 represents an image plane which is symmetric with respect to the optical axis. Because of the asymmetry of the optical system, the image plane 5 is asymmetric with respect to the optical axis AX. Consequently, a meridional one-side blur ΔM' and a sagittal one-side blur ΔS' are represented by the following expressions (d) and (e), respectively:

$$\Delta M' = \{\text{meridional value } (y'=0.7\text{field}, z=0, \theta=0.7°) - \text{meridional value } (y'=-0.7\text{field}, z=0, \theta=0.7°)\}/2 \quad (d)$$

$$\Delta S' = \{\text{sagittal value } (y'=0.7\text{field}, z=0, \theta=0.7°) - \text{sagittal value } (y+=-0.7\text{field}, z=0, \theta=0.7°)\}/2 \quad (e)$$

Figure 39C:
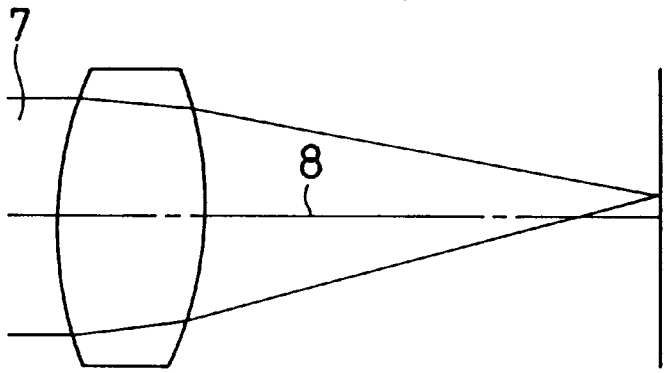

Axial coma {FIG. 39C}

Referring to FIG. 39C, reference numeral 7 represents an axial luminous flux, and reference numeral 8 represents an axial principal light beam. As shown in the figure, the axial luminous flux 7 is not symmetric with respect to the axial principal light beam 8, so that coma is generated. An axial coma AXCM generated at the axial luminous flux 7 is represented by the following expression (f):

$$AXCM = \{Y(\text{upper zonal}, \theta=0.7°) + Y(\text{lower zonal}, \theta=0.7°)\}/2 \quad (f)$$

Figure 39D:
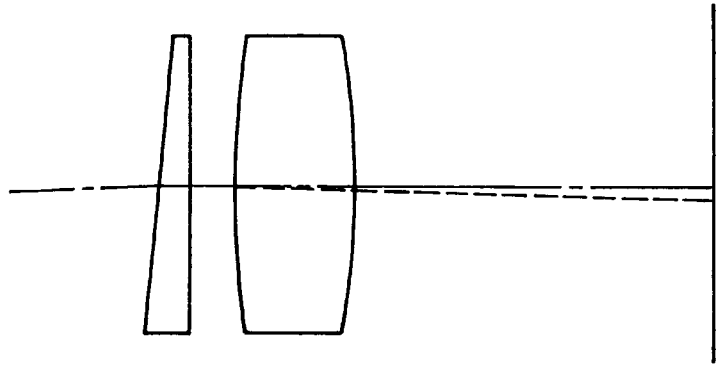

Axial lateral chromatic aberration {FIG. 39D}

The image point, which shifts according to the difference in wavelength, shifts on the axial light beam when the optical system is asymmetric. The axial lateral chromatic aberration generated in the axial principal light beam is represented by the following expression (g):

$$(\text{axial lateral chromatic aberration}) = \{Y(\text{g-line}, \theta=0.7°) - Y(\text{d-line}, \theta=0.7°)\} \quad (g)$$

With respect to the above-described decentering aberrations, an application method is shown in a paper "Theory of Tertiary Aberration of an Optical System Where Decentering Exits" by Mr. Yoshiya Matsui (JOEM, June, 1990). The method is suitable for a case where a normal taking lens is decentered due to an attachment error. However, it cannot be directly applied to a camera shake compensating optical system where a co-axial relationship among the object plane, the taking lens and the image plane is shifted. In order that the method of the paper can be directly applied to the camera shake compensating optical system, the actual aberrations of the camera shake compensating optical system are represented by tertiary aberration coefficients by performing the subsequently-described conversion of expressions.

Figure 40:
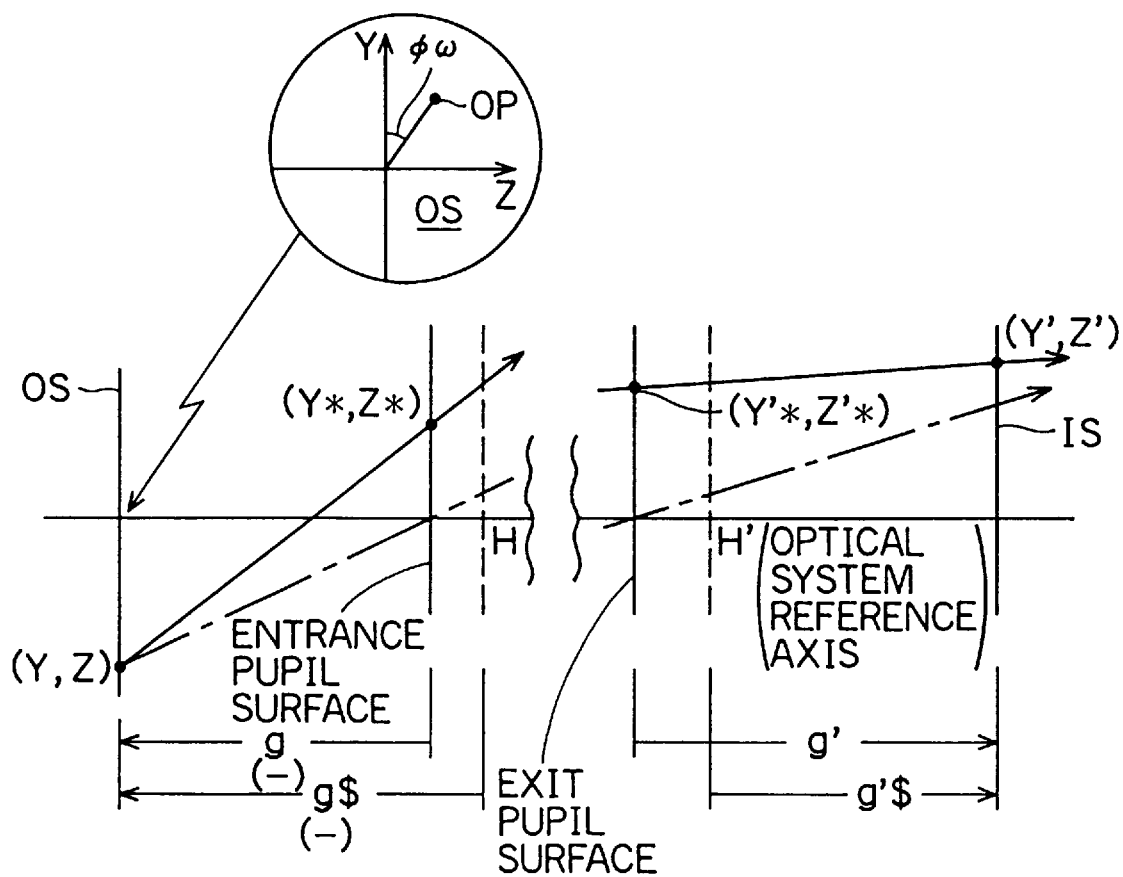
FIG. 40 is a view of assistance in explaining a relationship between the optical system and the coordinates.

Application of decentering aberration coefficients to camera shake compensating optical system Referring to FIG. 40 showing a relationship between the optical system and coordinates, how to obtain the decentering aberration coefficients will be described. First, the expressions are defined as follows:

$$\tan\omega \cdot \cos\phi\omega = \frac{Y}{g\$}$$

$$\tan\omega \cdot \sin\phi\omega = \frac{Z}{g\$}$$

$$R \cdot \cos\phi R = \frac{g\$}{g} \cdot Y*$$

$$R \cdot \sin\phi R = \frac{g\$}{g} \cdot Z*$$

where g and g$ are an entrance pupil surface and the distance from the object side principal plane to an object plane (object surface) OS, respectively, ω is an angle of a straight line between the object point and the object side principal point H, to a reference axis and φω is its azimuth, and R is a radius of entrance pupil converted on the object side principal plane and φR is its azimuth.

Image point movement amounts ΔY and ΔZ on an image plane (image surface) IS when a νth surface from the object side is parallely decentered by a slight amount Ev in the Y direction relative to the reference axis are represented by the following expressions (1A) and (1B):

$$\Delta Y = -(Ev/2\alpha'_k) \cdot [(\Delta E)\nu + \qquad (1A)$$
$$(N \cdot \tan\omega)^2 \cdot \{(2 + \cos2\phi\omega) \cdot (VE1)\nu - (VE2)\nu\} +$$
$$2R \cdot (N \cdot \tan\omega) \cdot \{(2\cos(\phi R - \phi\omega) + \cos(\phi R + \phi\omega)) \cdot (IIIE)\nu +$$
$$\cos\phi R \cdot \cos\phi\omega \cdot (PE)\nu\} + R^2 \cdot (2 + \cos2\phi R) \cdot (IIE)\nu]$$

$$\Delta Z = -(Ev/2\alpha'_k) \cdot [(N \cdot \tan\omega)^2 \cdot \sin2\phi\omega \cdot (VE1)\nu + \qquad (1B)$$
$$2R \cdot (N \cdot \tan\omega) \cdot \{\sin(\phi R + \phi\omega) \cdot (IIIE)\nu + \sin\phi R \cdot \sin\phi\omega \cdot (PE)\nu\} +$$
$$R^2 \cdot \sin2\phi R \cdot (IIE)\nu]$$

Here, when $(\Delta E)\nu$ is a prismatic effect (lateral shift of the image), $(VE1)\nu$ and $(VE2)\nu$ are rotationally asymmetric distortions, $(IIIE)\nu$ and $(PE)\nu$ are a rotationally asymmetric astigmatism and an inclination of the image surface, respectively, and $(IIE)\nu$ is a rotationally asymmetric coma which is present also on the axis, the decentering aberration coefficients representing the effects of the decentering are represented by the following expressions (1C) to (1H) based on the aberration coefficients of from the vth surface to the image surface (# is a suffix representative of "on the object surface"). In the case of rotational decentering, the decentering aberration coefficients are represented by expressions similar to the expressions (1A) to (1H):

$$(\Delta E)\nu = -(\alpha\nu' - \alpha\nu) \qquad (1C)$$

$$(VE1)\nu = [\{\alpha\nu' \cdot (\mu = \nu + 1 \to k)\Sigma V\mu\} - \qquad (1D)$$
$$\{\alpha\nu \cdot (\mu = \nu \to k)\Sigma V\mu\}] - [\{\alpha\nu'\# \cdot (\mu = \nu + 1 \to k)\Sigma III\mu\} -$$
$$\{\alpha\nu\# \cdot (\mu = \nu \to k)\Sigma III\mu\}]$$

$$(VE2)\nu = \{\alpha\nu'\# \cdot (\mu = \nu + 1 \to k)\Sigma P\mu\} - \{\alpha\nu\# \cdot (\mu = \nu \to k)\Sigma P\mu\} \qquad (1E)$$

$$(IIIE)\nu = [\{\alpha\nu' \cdot (\mu = \nu + 1 \to k)\Sigma III\mu\} - \qquad (1F)$$
$$\{\alpha\nu \cdot (\mu = \nu \to k)\Sigma III\mu\}] - [\{\alpha\nu'\# \cdot (\mu = \nu + 1 \to k)\Sigma II\mu\} -$$
$$\{\alpha\nu\# \cdot (\mu = \nu \to k)\Sigma II\mu\}]$$

$$(PE)\nu = \{\alpha\nu' \cdot (\mu = \nu + 1 \to k)\Sigma P\mu\} - \{\alpha\nu \cdot (\mu = \nu \to k)\Sigma P\mu\} \qquad (1G)$$

$$(IIE)\nu = [\{\alpha\nu' \cdot (\mu = \nu + 1 \to k)\Sigma II\mu\} - \qquad (1H)$$
$$\{\alpha\nu \cdot (\mu = \nu \to k)\Sigma II\mu\}] - [\{\alpha\nu'\# \cdot (\mu = \nu + 1 \to k)\Sigma I\mu\} -$$
$$\{\alpha\nu\# \cdot (\mu = \nu \to k)\Sigma I\mu\}]$$

However, in order to apply the decentering aberration coefficients to the camera shake compensating optical system, it is necessary to replace the image surface IS with the object surface OS by a reversal of the optical system to use aberration coefficients from the image surface IS. That is, the image point movement amounts must be converted to those of the object surface OS. The reasons therefor will be described.

Figure 41A:
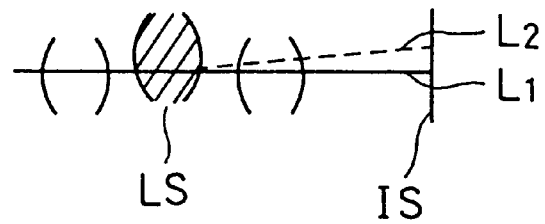
FIGS. 41A and 41B are views of assistance in explaining the difference in light beam passing position due to decentering.
Figure 41B:
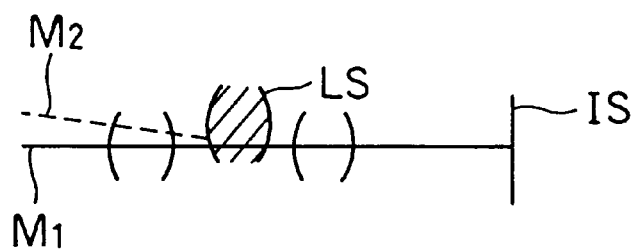

The first reason is that the light beam passing position shifts due to decentering. Referring to FIG. 41A ($L_1$ represents a light beam before decentering and $L_2$ represents a light beam after decentering), according to the above-described method of Mr. Matsui's paper, the light beam passing position on the image surface IS side of a decentering lens LS is shifted by the decentering lens LS. Consequently, the aberration coefficients of the decentering lens LS and of the decentering lens LS to the image surface IS relate to the decentering aberration coefficients. On the contrary, referring to FIG. 41B ($M_1$ represents a light beam before camera shake compensation and $M_2$ represents a light beam after camera shake compensation), in the camera shake compensating optical system (ideally), the light beam passing position on the object side of the decentering lens LS differs between before camera shake compensation and after camera shake compensation. Consequently, the aberration coefficients of the decentering lens LS and the lenses located on the object side of the decentering lens LS relate to the decentering aberration coefficients.

Figure 42:
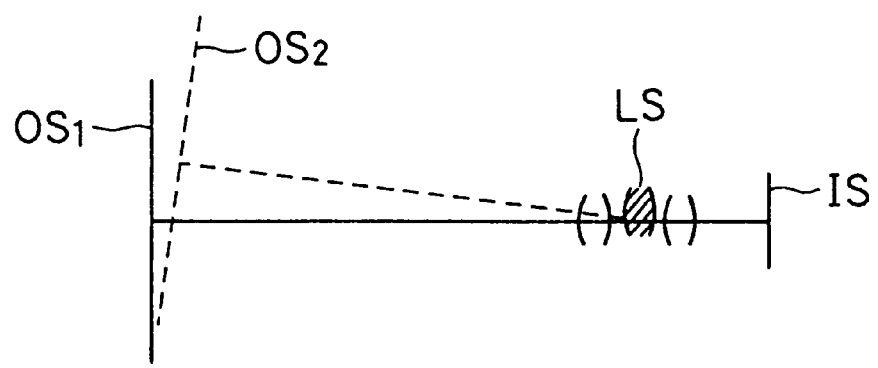
FIG. 42 is a view of assistance in explaining rotational conversion of the object surface.

The second reason is that the aberrations sometimes degrade due to a rotational conversion of the object surface. According to the above-described method of Mr. Matsui's paper, neither the object surface $OS_1$ nor the image surface IS moves, whereas in the camera shake compensating optical system, the object surface $OS_1$ rotates as shown in FIG. 42. For this reason, the off-axial image point movement error and the one-side blur are great compared to the case where the object surface does not rotate. In FIG. 42, $OS_1$ represents an object surface before camera shake compensation and $OS_2$ represents an object surface after camera shake compensation.

Figure 43:
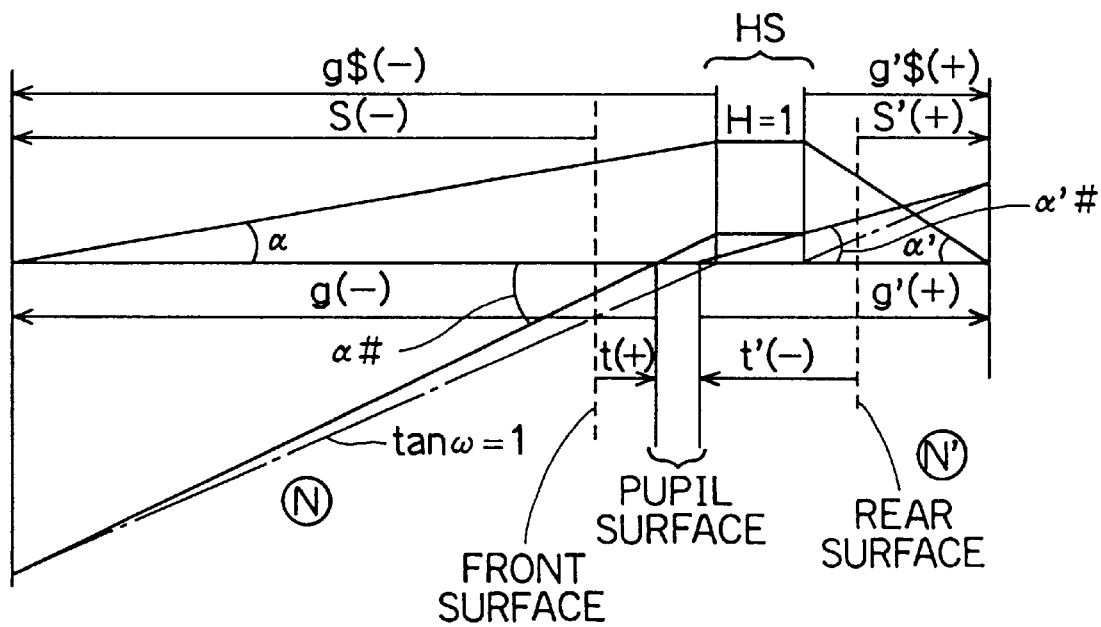
FIG. 43 is a view of assistance in explaining aberration coefficients of reversal and non-reversal optical systems.

Aberration coefficients of reversal optical system and aberration coefficients of non-reversal optical system Since the image point movement amounts must be converted to those of the object surface for the above-described reasons, the coefficients of the expressions (1A) to (1H) are converted according to the following expressions (2A) to (2J) represented based on FIG. 43 (non-reversal optical system):

$$^R\alpha = {^RN}/{^Rg\$} = -\alpha' \qquad (2A)$$

$$^R\alpha\# = \alpha'\# \qquad (2B)$$

$$^R\alpha\mu' = -\alpha\nu \qquad (2C)$$

$$^R\alpha\mu'\# = \alpha\nu\# \qquad (2D)$$

$$^RP\mu = P\nu \ldots \text{same} \qquad (2E)$$

$$^R\phi\mu = \phi\nu \ldots \text{same} \qquad (2F)$$

$$^RI\mu = I\nu \ldots \text{same} \qquad (2G)$$

$$^RII\mu = -II\nu \ldots \text{reverse} \qquad (2H)$$

$$^RIII\mu = III\nu \ldots \text{same} \qquad (2I)$$

$$^RV\mu = -V\nu \ldots \text{reverse} \qquad (2J)$$

where $^R(\ )$ represents a reversal optical system and N is a refractive index.

Decentering aberration coefficients and camera shake aberration coefficients when compensating lens unit parallely decenters Since the previously-mentioned expressions (1A) to (1H) show a case where only one surface v is decentered, they are converted to expressions showing a case where a plurality of surfaces i to j are decentered. When the compensating lens unit is parallely decentered, since the decentering amounts Ei to Ej of the decentered surfaces i to j are the same, the aberration coefficients can be treated as a sum as shown in the following expression:

$$(\Delta E)i \text{ to } j=(\nu=i \to j)\Sigma\{-2 \cdot (\alpha\nu'-\alpha\nu)\}$$

From $\alpha\nu'=\alpha\nu+1$, the following expression is obtained:

$(\Delta E)i$ to $j=-2\cdot(\alpha j'-\alpha i)$

Likewise, with respect to other aberration coefficients, the terms between Σs are deleted. For example, $$(PE)i \text{ to } j = (\mu = i \rightarrow j)\Sigma\{\alpha v' \cdot (\mu = v+1 \rightarrow k)\Sigma P\mu - \alpha v \cdot (\mu = v \rightarrow k)\Sigma P\mu\}$$

$$= \alpha j' \cdot (\mu = j+1 \rightarrow k)\Sigma P\mu - \alpha i \cdot (\mu = i \rightarrow k)\Sigma P\mu$$

This is further converted to $(PE)i$ to $j=(\alpha j'-\alpha i)\cdot(\mu=j+1\rightarrow k)$ $\Sigma P\mu - \alpha i\cdot(\mu=i$ to $j)\Sigma P\mu$ where $(\mu=j+1\rightarrow k)\Sigma P\mu$ is the sum of P (Petzval) of the lenses arranged behind the compensating lens unit, and $(\mu=i$ to $j)\Sigma P\mu$ is the sum of P of the compensating lens unit.

$(PE)i$ to $j=(\alpha j'-\alpha i)P_R - \alpha i\cdot P_D$ where $(\ )_R$ is the sum of the aberration coefficients of the lenses arranged behind the compensating lens and $(\ )_D$ is the sum of the aberration coefficients of the compensating lens unit.

As described above, by the conversion of the image point movement amounts to those of the object surface and the conversion of the expressions to the expressions showing the case where a plurality of surfaces i to j are decentered, the decentering aberration coefficients represented by the following expressions (3A) to (3F) are obtained. By re-defining the decentering aberration coefficients according to the expressions (3A) to (3F), the expressions (1A) to (1H) can be used as they are as expressions representing the image point movement amounts on the object surface.

$(\Delta E)i$ to $j=-2\cdot(\alpha j'-\alpha i)$ (3A)

$(VE1)i$ to $j=(\alpha j'-\alpha i)\cdot V_R - (\alpha j'\# - \alpha i\#)\cdot III_R - (\alpha i\cdot V_D - \alpha i\# III_D)$ (3B)

$(VE2)i$ to $j=(\alpha j\# - \alpha i\#)\cdot P_R \alpha i\# P_D$ (3C)

$(IIIE)i$ to $j=(\alpha j'-\alpha i)\cdot III_R - (\alpha j'\# - \alpha i\#)\cdot II_R - (\alpha a\cdot III_D - \alpha i\# II_D)$ (3D)

$(PE)i$ to $j=(\alpha j'-\alpha i)\cdot P_R - \alpha i\cdot P_D$ (3E)

$(IIE)i$ to $j=(\alpha j'-\alpha i)\cdot II_R - (\alpha j'\# - \alpha i\#)\cdot I_R - (\alpha a\cdot II_D - \alpha i\# I_D)$ (3F)

Off-axial image point movement error

Subsequently, the off-axial image point movement error will be described. The decentering aberration coefficients (of the reversal optical systems) are represented by ΔE, VE1, VE2, IIIE, PE and IIE. The movements of the image point (before rotational conversion on the object surface) due to decentering on the object surface are represented by the following expressions (4A) and (4B) (in the principal ray (R=0)). The expressions (4A) and (4B) are the expressions (1A) and (1B) where R=0.

$\Delta Y\#=-(E/2\alpha'_k)\cdot[\Delta E'(N\cdot\tan\omega)^2\cdot\{(2+\cos^2\phi\omega)VE1-VE2\}]$ (4A)

$\Delta Z\#=-(E/2\alpha')\cdot\{(N\cdot\tan\omega)^2\cdot\sin 2\phi\omega\cdot VE1\}$ (4B)

Based on the expressions (4A) and (4B), the following expressions (4C) and (4D) are obtained (axial ray, $\tan\omega=0$):

$\Delta Y_0\#=-(E/2\alpha'_k)\cdot\Delta E$ (4C)

$\Delta Z_0\#=0$ (4D)

Figure 44A:
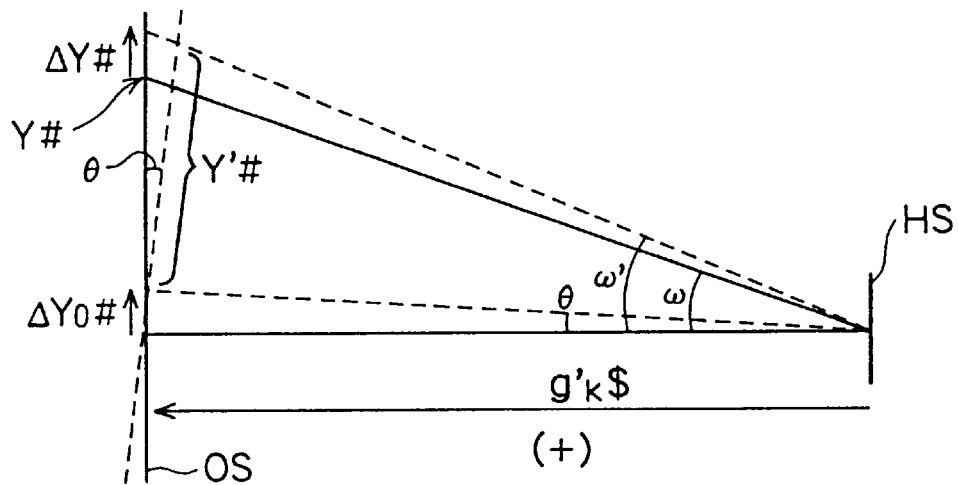
FIGS. 44A and 44B are views of assistance in explaining rotational conversion.
Figure 44B:
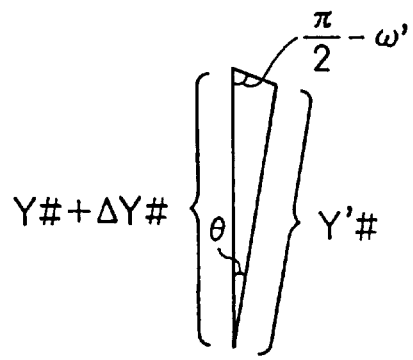

Subsequently, the rotational conversion will be described with reference to FIGS. 44A and 44B. From FIG. 44A, the following expression holds:

$Y\#=gS_k\cdot\tan\omega$

From the sine theorem, $Y'\#/\{\sin(\pi/2-\omega')\}=(Y\#+\Delta Y\#-\Delta Y_0\#)/\{\sin(\pi/2+\omega-\theta)\}$ ΔY'# after the rotational conversion is represented by the following expression:

$$\Delta Y'\# = (Y'\#) - (Y\#)$$
$$= [Y\#\cdot\cos\omega' + \{(\Delta Y\#) - (\Delta Y_0\#)\}\cdot\cos\omega' - Y\#\cdot\cos(\omega'-\theta)]/\cos(\omega'-\theta)$$

Only the numerators of this expression are converted.

$$[Y\#\cdot\cos\omega' + \{(\Delta Y\#) - (\Delta Y_0\#)\}\cdot\cos\omega' - Y\#\cdot\cos(\omega'-\theta)]$$
$$= Y\#\cdot\cos\omega' + \{(\Delta Y\#) - (\Delta Y_0\#)\}\cdot\cos\omega' - Y\#\cdot\cos\theta\cdot\cos\omega' - Y\#\cdot\sin\theta\cdot\sin\omega'$$
$$= (1-\cos\theta)\cdot Y\#\cdot\cos\omega' + \{(\Delta Y\#) - (\Delta Y_0\#)\}\cdot\cos\omega' - Y\#\cdot\sin\theta\cdot\sin\omega'$$

Here, since θ is small and ignorable compared to the other values, $(1-\cos\theta)\approx\theta^2/2$, $\sin\theta\approx\theta$, and $\cos\omega'/\{\cos(\omega'-\theta)\}\approx 1$, $\sin\omega'/\{\cos(\omega'-\theta)\}\approx\tan\omega$.

Therefore, the following expression is obtained:

$\Delta Y'\#\approx(\Delta Y\#-\Delta Y_0\#)-Y_\#\cdot\theta\cdot\tan\omega$ $(\Delta Y\#-\Delta Y_0\#)$ represents the off-axial image point movement error of parallel decentering and Y#θtan ω is an additional term (irrelevant to the aberration coefficients) due to rotation. Since ω at this time is on an X-Y cross section, $\Delta Y'\#\approx(\Delta Y\#-\Delta Y_0\#)-Y\#\cdot\theta\cdot\tan\omega\cdot\cos\phi\omega$ (5A)

Figure 45:
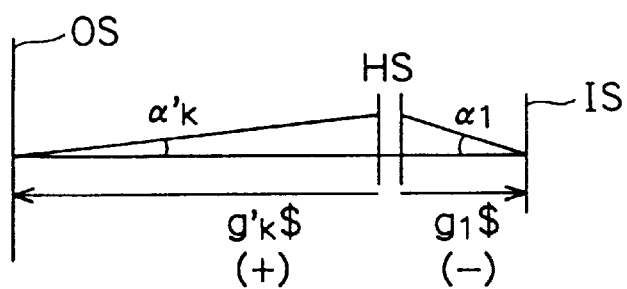
FIG. 45 is a view of assistance in explaining conversion to the image surface.

Subsequently, the conversion to the image surface IS will be described with reference to FIG. 45. A magnification β is represented by the following expression:

$\beta=gS_1/gS_k=\alpha_k'/\alpha_1$ where $\alpha_1=1/gS_1$. The relationship between the image surface IS and the object surface OS is represented by the following expression:

$Y=\beta\cdot Y\#$

Y# and ΔY# which take the form of $1/\alpha_k\cdot x(\ )$ are converted as follows:

$$Y = \beta \cdot Y\#$$
$$= (\alpha'_k/\alpha_1) \cdot (1/\alpha'_k) \times (\ )$$
$$= g\$_1 \times (\ )$$

Here, if $g\$_k' \to$ , $g\$_1 = -F1$. Therefore, the following expression holds:

$$Y = -F1 \times (\ )$$
$$= -F1 \times \alpha'_k \times Y\#$$

Subsequently, the off-axial image point movement error on the image surface will be described. From the expression (4C) and $\alpha_k' = 1/g_k'\$$, a decentering amount E is represented by the following expressions:

$$\theta = \Delta Y_0 \# / g\$_k' = E \cdot \Delta E / 2$$
$$E = 2 \cdot \theta / \Delta E$$

Normalization is performed so that the camera shake compensation angle $\theta$ is constant (0.7deg=0.0122173rad).

By performing parallel decentering (rotational decentering is not performed) to image-surface-convert $\Delta Y = (\Delta Y\# - \Delta Y_0\#)$ (here, $N \cdot \tan \omega = \Phi / F1$, $\Phi^2 = Y^2 + Z^2$), the following expressions (6A) to (6D) are obtained:

$$\Delta Y = (\theta \cdot \Phi^2 / F1) \cdot [\{2 + \cos 2 \cdot \phi \omega\} \cdot VE1 - VE2\}/\Delta E] \quad (6A)$$

$$\Delta Z = (\theta \cdot \Phi^2 / F1) \cdot [\{(\sin 2 \cdot \phi \omega) \cdot VE1 - VE2\}/\Delta E] \quad (6B)$$

$Y_+$ image point, $Y_-$ image point $\{\Phi \omega = 0, \pi$ of the expressions (6A) and (6B)$\}$:

$$\Delta Y_Y = (\theta \cdot Y^2 / F1) \cdot \{(3 \cdot VE1 - VE2)/\Delta E\} \quad (6C)$$

Z image point $\{\phi \omega = \pi/2$ of the expressions (6A) and (6B)$\}$ $$\Delta Y_Z = (\theta \cdot Z^2 / F1) \cdot \{(VE1 - VE2)/\Delta E\} \quad (6D)$$

Then, rotational conversion is performed. Since $Y\# = -Y/(F1 \times \alpha_k')$, with respect to $-Y\# \cdot \theta \cdot \tan \omega \cdot \cos \phi \omega$ of the expression (5A), the following expression holds:

$$-Y\# \cdot \theta \cdot \tan \omega \cdot \cos \phi \omega = Y/(F1 \times \alpha_k') \cdot \theta \cdot \tan \omega \cdot \cos \phi \omega$$

At the $Y_+$ image point and the $Y_-$ image point, since $\phi \omega = 0$, $\pi$ and $\tan \omega / \alpha_k' = Y$, $-Y\# \cdot \theta \cdot \tan \omega \cdot \cos \phi \omega$ on the image surface is $-Y\# \cdot \theta \cdot \tan \omega \cdot \cos \phi \omega = Y^2 \cdot \theta / F1$. By adding this to the expression (6C), the following expression (6E) is obtained. At the Z image point, since $\phi \omega = \pi/2$, $-Y\# \cdot \theta \cdot \tan \omega \cdot \cos \phi \omega$ on the image surface is $-Y\# \cdot \theta \cdot \tan \omega \cdot \cos \phi \omega = 0$. By adding this to the expression (6D), the following expression (6F) is obtained:

$$\Delta Y_Y' = (\theta \cdot Y^2 / F1) \cdot \{(3 \cdot VE1 - VE3 - \Delta E)/\Delta E\} \quad (6E)$$

$$\Delta Y_Z' = \Delta Y_Z \quad (6F)$$

One-side blur

Subsequently, the one-side blur will be described. From the expressions (1A) and (1B), $\Delta M$ is $\{$(primary term of R) of $\Delta Y$ $\phi R = 0\} \times g\$_k'$ and $\Delta S$ is $\{$(primary term of R) of $\Delta Z$ $\phi R = \pi/2\} \times g\$_k'$. Before rotation, the following expression holds on the object surface OS (here, $\alpha_k' = N_k'/g\$_k'$ and $E/2 = \theta/\Delta E$ are used):

$$\Delta M\# = (-g\$_k'^2 \cdot \theta / N_k') \times 2 \cdot R \cdot (N \cdot \tan \omega) \cdot \cos \phi \omega \cdot \{(3 \cdot IIIE + PE)/\Delta E\}$$

After the rotation, the following expression holds:

$$\Delta M'\# \approx \Delta M\# + \theta Y\#$$

By converting the aberration coefficients to those on the image surface and substituting $N_k' = 1$ and $N = 1$, the following expression is obtained:

$$\Delta M' = \beta^2 \cdot \Delta M'\# = -g\$_1^2 \cdot \theta \times 2 \cdot \tan \omega \cdot \cos \phi \omega \cdot \{(3 \cdot IIIE + PE)/\Delta E\} + \beta \cdot Y \cdot \theta$$

If the object surface OS is (here, $g\$_1 = -F1$, $\beta \to 0$, $\tan \omega = Y/F1$ and $\phi \omega = 0$), the following expression (7A) representative of a meridional one-side blur $\Delta M'$ is obtained. Likewise, an expression (7B) representative of a sagittal one-side blur is obtained.

$$\Delta M' = -2 \cdot F1 \cdot Y \cdot \theta \cdot R \cdot \{(3 \cdot IIIE + PE)/\Delta E\} \quad (7A)$$

$$\Delta S' = -2 \cdot F1 \cdot Y \cdot \theta \cdot R \cdot \{(IIIE + PE)/\Delta E\} \quad (7B)$$

Axial coma

Subsequently, axial coma will be described. Based on the expression (1A), coma of upper ray by $\omega = 0$ and decentering is represented by the following expression:

$$\Delta Y_{Upper}\# = \Delta Y\#(\omega = 0, \phi_R = 0) - \Delta Y\#(\omega = 0, R = 0)$$
$$= -E/(2 \cdot \alpha') \times R^2 \times 3 \cdot IIE$$

Coma of lower ray by $\omega = 0$ and decentering (the same as $\Delta Y_{Upper}\#$ including the sign) is represented by the following expression:

$$\Delta Y_{Lower}\# = \Delta Y_\#(\omega = 0, \phi_R = 0) - \Delta Y\#(\omega = 0, R = 0)$$
$$= -E/(2 \cdot \alpha') \times R^2 \times 3 \cdot IIE$$

Since $\omega = 0$, axial coma is hardly varied by the rotational conversion. By the conversion from the object surface OS to the image surface IS ($\Delta Y = \beta \cdot \Delta Y\#$, $E/2 = \theta/\Delta E$), the following expression is obtained $$\Delta Y_{Upper} = F1 \times \theta \times R^2 \times (3 \cdot / \Delta E) = \Delta Y_{Lower}$$

The axial coma AXCM is represented by the following expression (8A):

$$AXCM = (\Delta Y_{Upper} + \Delta Y_{Lower})/2 \quad (8A)$$
$$= \Delta Y_{Upper}$$

A part of each of the expressions (6E), (6F), (7A), (7B) and (8A) is newly defined as an aberration coefficient represented by the following expressions (9A) to (9E):

Off-axial image point movement error of the image point on the
Y-axis ... $VE_Y = \{(3 \cdot VE1 - VE2 - \Delta E)/\Delta E\}$ (9A)

Off-axial image point movement error of the image point on the
Z-axis ... $VE_Z = \{(VE1 - VE2)/\Delta E\}$ (9B)

Marginal one-side blur ... $IIIE_M = \{(3 \cdot IIIE + PE)/\Delta E\}$ (9C)

Sagittal one-side blur ... $IIIE_S = \{(IIIE + PE)/\Delta E\}$ (9D)

Axial coma ... $IIE_A = \{(3 \cdot IIE)/\Delta E\}$ (9E)

By substituting the expressions (3A) to (3F) in the expressions (9A) to (9B) representative of the camera shake aberration coefficients, the following expressions (10A) to (10E) representative of camera shake aberration coefficients are obtained:

$VE_Y = -\frac{1}{2} \cdot \{3V_R - 3V_D \cdot A + 2 - (3 \cdot III_R + P_R) \cdot H\# + (3 \cdot III_D + P_D) \cdot A\#\}$ (10A)

$VE_Z = -\frac{1}{2} \cdot \{V_R - V_D \cdot A - (III_R + P_R) \cdot H\# + (III_D + P_D) \cdot A\#\}$ (10B)

$IIIE_M = -\frac{1}{2} \cdot \{(3 \cdot III_R + P_R) - (3 \cdot III_D + P_D)\} \#A - 3 \cdot II_R \cdot H\# + 3 \cdot II_D \cdot A\#\}$ (10C)

$IIIE_S = -\frac{1}{2} \cdot \{(III_R + P_R) - (III_D + P_D) \cdot A - II_R \cdot H\# + II_D \cdot A\#\}$ (10D)

$IIE_A = -3/2 \cdot (II_R + II_D \cdot A - I_R \cdot H\# + I_D \cdot A\#)$ (10E)

where $(\ )_D$ is the sum of the aberration coefficients of the compensating lens unit;

$(\ )_R$ is the sum of the aberration coefficients of the lens units arranged behind (on the object side of) the compensating lens unit;

$A = \alpha i/(\alpha j' - \alpha i)$ (here, the compensating lens units are i to j), $A\# = \alpha i\#/(\alpha j' - \alpha i)$; and $H\# = (\alpha i'\# - \alpha i\#)/(\alpha j' - \alpha i)$.

$\Delta E = -2 \cdot (\alpha j' - \alpha i)$ (here, $(\alpha j' - \alpha i)$ is ±0.0122173 when 0.70°/mm) which is the coefficient of (camera shake compensation angle/(decentering amount) aims substantially at a predetermined value (however, the sign differs according to whether the compensating lens units are positive or negative). Therefore, A is an incident angle of a marginal ray to the compensating lens units (viewed from the image side) and A# is proportional to the incident angle of the principal ray. When h# and h do not vary so much in the compensating lens units, H# represents a ratio between h# of the principal ray and h of the marginal ray.

Since the decentering aberration coefficients in the expressions (10A) to (10E) are defined as those of the reversal optical system, it is necessary to return them to the coefficients of the non-reversal optical system. Returning the coefficients in the expressions (10A) to (10E) by using the expressions (2A) to (2J), the following expressions (11A) to (11E) are obtained:

$VE_Y = +\frac{1}{2} \cdot \{3V_F - 3V_D \cdot A + 2 + (3 \cdot III_F + P_F) \cdot H\# - (3 \cdot III_D + P_D) \cdot A\#\}$ (11A)

$VE_Z = +\frac{1}{2} \cdot \{V_F - V_D \cdot A + (III_F + P_F) \cdot H\# - (III_D + P_D) \cdot A_{190}\}$ (11B)

$IIIE_M = -\frac{1}{2} \cdot \{(3 \cdot III_F + P_F) - (3 \cdot III_D + P_D)\} \#A + 3 \cdot II_F \cdot H\# - 3 \cdot II_D \cdot A\#\}$ (11C)

$IIIE_S = -\frac{1}{2} \cdot \{(III_F + P_F) - (III_D + P_D) \cdot A + II_F \cdot H\# - II_D \cdot A\#\}$ (11D)

$IIE_A = +3/2 \cdot (II_F + II_D \cdot A - I_F \cdot H\# - I_D \cdot A_{190})$ (11E)

where $(\ )_D$ is the sum of the aberration coefficients of the compensating lens units and the non-reversal optical system;

$(\ )_F$ is the sum of the aberration coefficients of the lens units arranged in front of the compensating lens units;

$A = -\alpha n'/(\alpha n' - \alpha m)$;

$A\# = \alpha n'\#/(\alpha n' - \alpha m)$;

$H = -(\alpha n'\# - \alpha m\#)/(\alpha n' - \alpha m) = -(\Sigma h \mu \# \cdot \phi \mu)/(\Sigma h \mu \cdot \phi \mu)$; and $\Delta E = -2(\alpha n' - \alpha m)$ (compensating lens units: m→n, non-reversal lens system: j←i).

From the expressions (11A) to (11E), the following are understood: First, as described previously, while the decentered lens unit and the lens units arranged therebehind relate to the performance according to the method of Mr. Matsui's paper, the decentered lens unit and the lens units arranged therebefore relate to the performance in the expressions (11A) to (11E). Secondly, the off-axial image point movement error tends to increase in wide angle optical systems (the focal length F1 of the compensating lens unit is the denominator) and one-side blur and axial coma tend to increase in telephoto optical systems.

Thirdly, although the degradation of aberrations due to decentering decreases by reducing the aberration coefficients of the decentered lens unit and the lens units arranged therebefore, a constant (−2 in { } of the expression (11A)) remains in the coefficient $VE_Y$ of the off-axial image point movement error $\Delta Y_Y'$. This is a term generated since the object surface OS and the image surface IS incline relative to each other due to rotational camera shake. The off-axial image point movement error due to the constant term (−2) is remarkably great in wide angle optical systems. For example, the off-axial image point movement error $\Delta Y_Y' = -72 \mu m$ at a focal length F1 of 38 mm, which is not ignorable. The off-axial image point movement error due to the constant term (−2) remains even if the aberration coefficients are 0. Therefore, it is preferable to set the aberration coefficients so that the constant term (−2) is canceled. The condition (3) is a condition therefor.

Fourthly, in order to reduce the aberration degradation due to decentering, it is necessary to reduce the aberration coefficients and the coefficients such as A, A# and H# multiplied by the aberration coefficients. In order to reduce A and A#, it is necessary to increase the denominator $\alpha_n' - \alpha_m$. However, since this is directly connected to $\Delta E = -2(\alpha_n' - \alpha_m)$, if it is too great, the camera shake compensation sensitivity (how many degrees the luminous flux is bent at when the lens is decentered by predetermined millimeters) is too high, so that a mechanical driving accuracy is necessary. With respect to H#, the closer the compensating lens unit is to the aperture stop, the smaller h# of each surface is, so that H# is also small.

Numerical data of first to fourth embodiments of the present invention are shown in Tables 2 to 5. In each table, ri (i=1, 2, 3, . . . ) is a radius of curvature of an ith surface counted from the object side, di (i=1, 2, 3, . . . ) is an ith axial distance counted from the object side, and Ni (i=1, 2, 3, . . . ) and vi (i=1, 2, 3, . . . ) are a refractive index and an Abbe number to the d-line of an ith lens counted from the object surface (in the fourth embodiment, the refractive indices and Abbe numbers of lenses L11F and L11R are represented by N11F, N11R, v11F and v11R). f is a focal length of the entire lens system. FNO is an F-number (in the first, second and fourth embodiments, focal lengths f at the shortest focal length condition (W) and at the longest focal length condition (T) and corresponding F-numbers are shown).

In each table, the surfaces marked with asterisks are aspherical and defined by the following expression representative of the surface configuration of an aspherical surface:

$$X = \frac{C \cdot Y^2}{1 + (1 - \varepsilon \cdot Y^2 \cdot C^2)^{\frac{1}{2}}} + \sum_i Ai Y^i$$

where X is an amount of displacement from the reference surface along the optical axis, Y is a height in a direction vertical to the optical axis, C is a paraxial curvature, $\varepsilon$ is a conic constant, and Ai is an ith aspherical coefficient.

Figure 11:
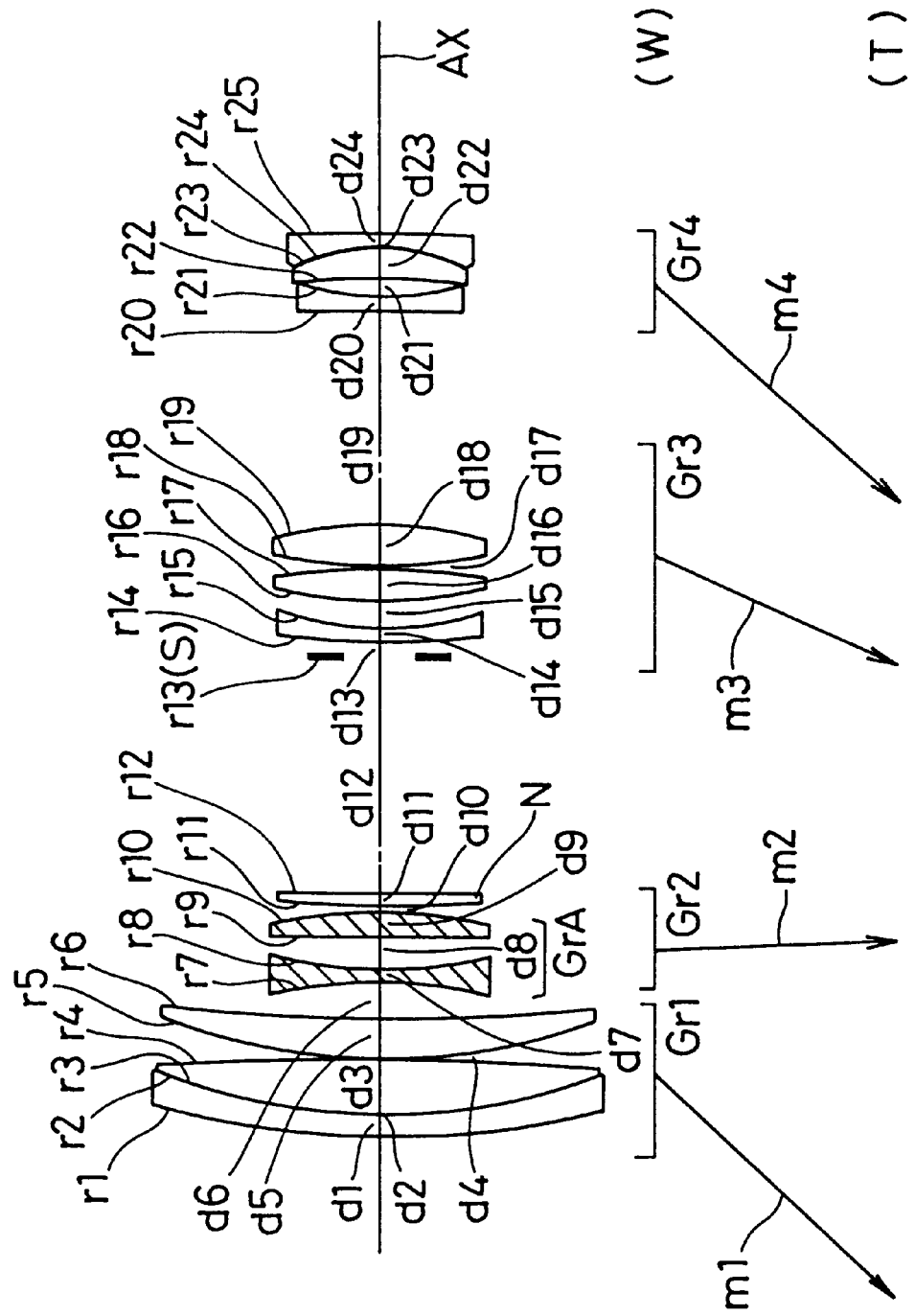
FIG. 11 shows the lens arrangement of a second embodiment of the present invention.
Figure 12A:
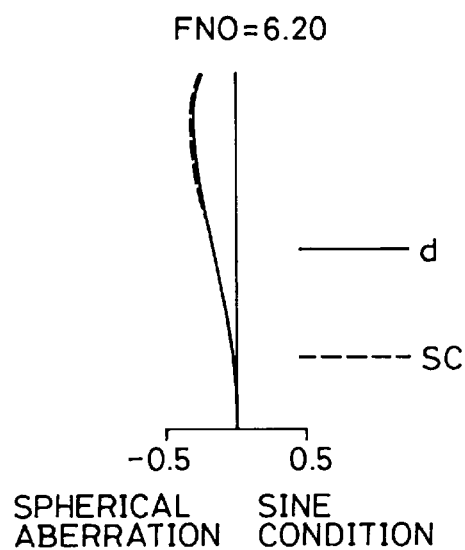
FIGS. 12A to 12C show longitudinal aberrations of the second embodiment before decentering at the shortest focal length condition.
Figure 12B:
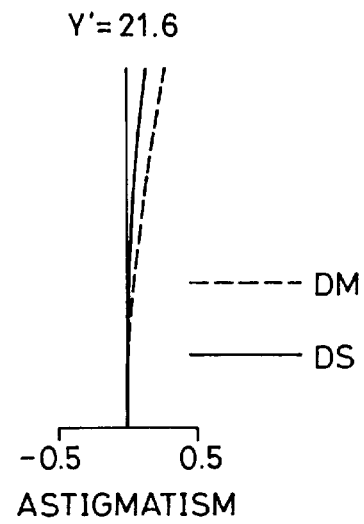
Figure 12C:
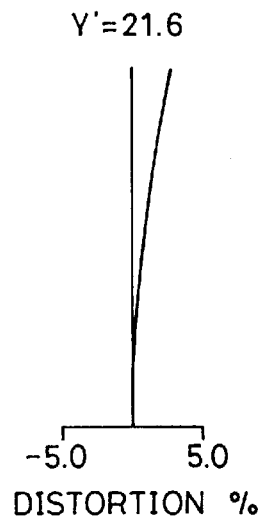
Figure 12D:
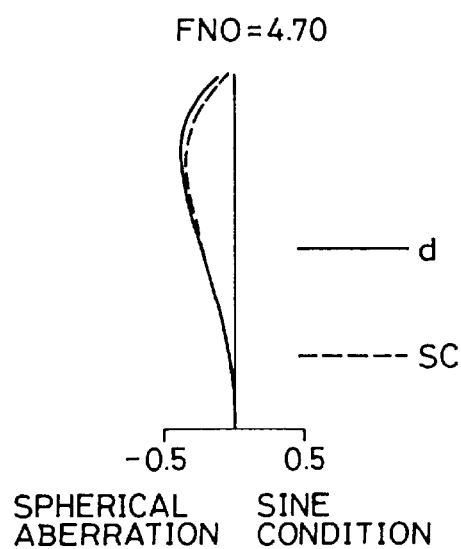
FIGS. 12D to 12F show longitudinal aberrations of the second embodiment before decentering at the longest focal length condition.
Figure 12E:
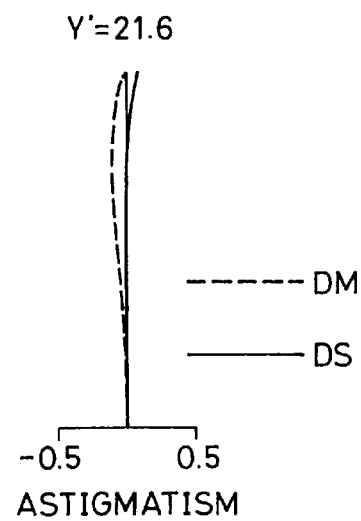
Figure 12F:
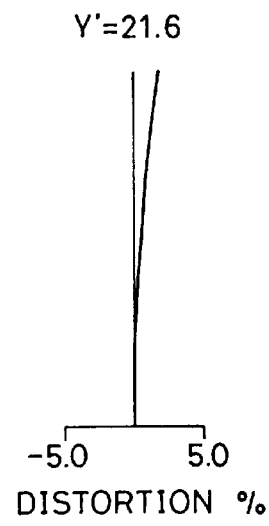
Figure 13A:
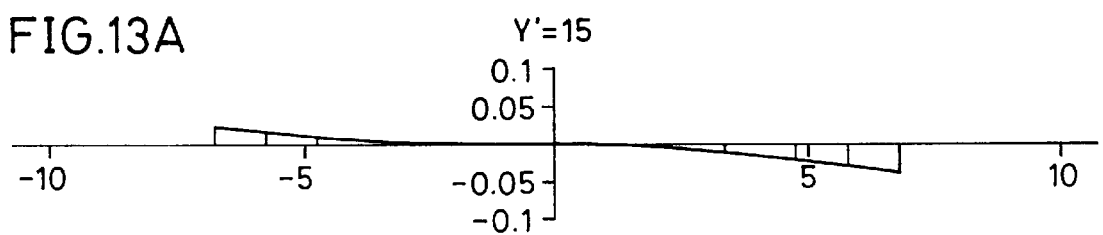
FIGS. 13A and 13B show meridional lateral aberrations of the second embodiment at the shortest focal length condition before decentering.
Figure 13B:
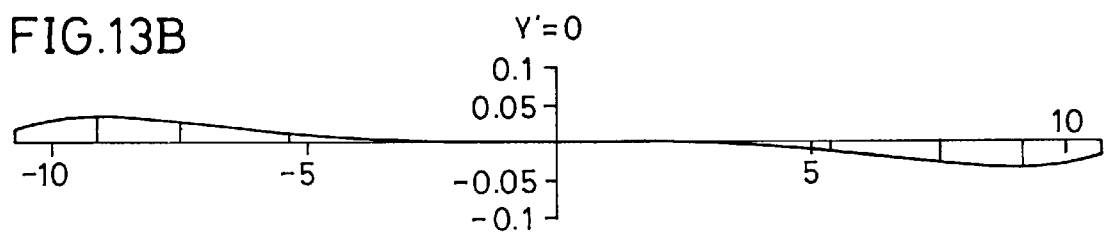
Figure 14A:
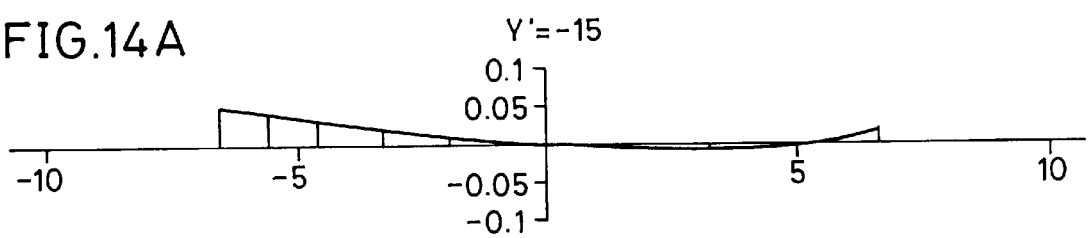
FIGS. 14A to 14C show meridional lateral aberrations of the second embodiment at the shortest focal length condition after decentering.
Figure 14B:
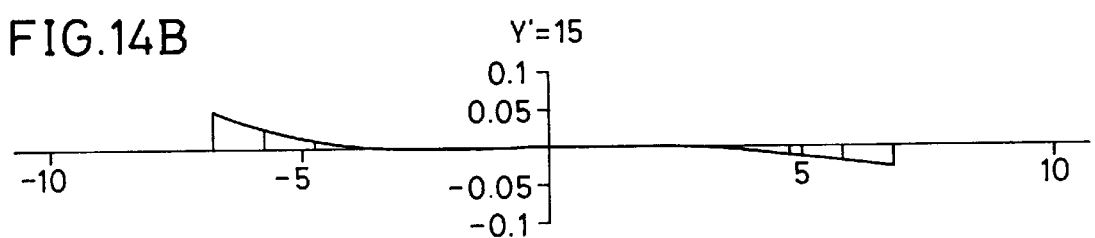
Figure 14C:
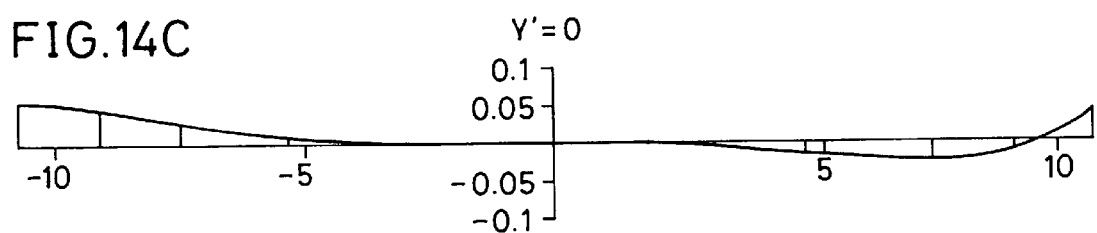
Figure 15A:
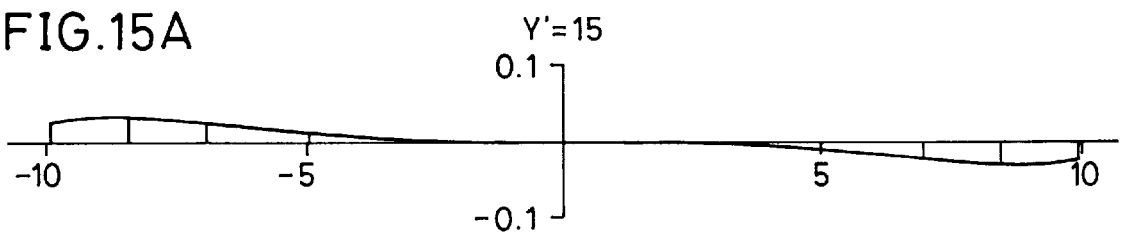
FIGS. 15A and 15B show sagittal lateral aberrations of the second embodiment at the shortest focal length condition before decentering.
Figure 15B:
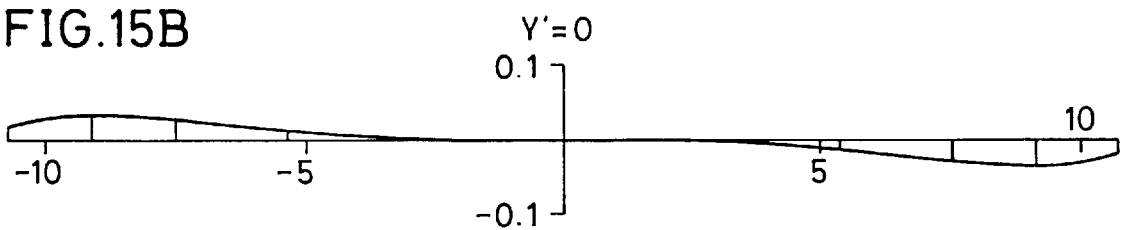
Figure 16A:
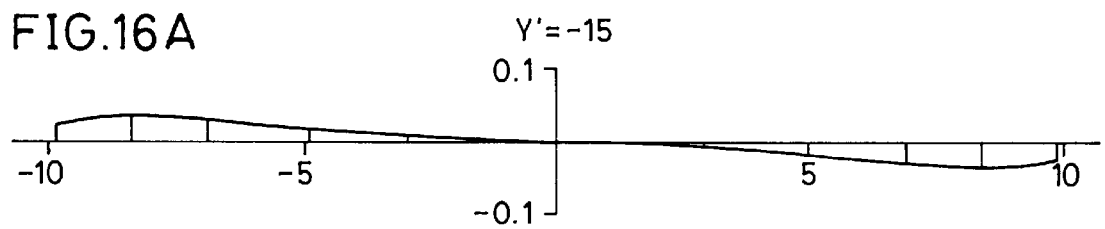
FIGS. 16A to 16C show sagittal lateral aberrations of the second embodiment at the shortest focal length condition after decentering.
Figure 16B:
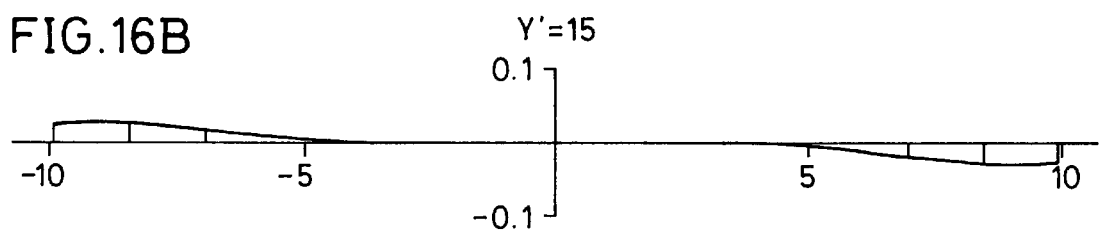
Figure 16C:
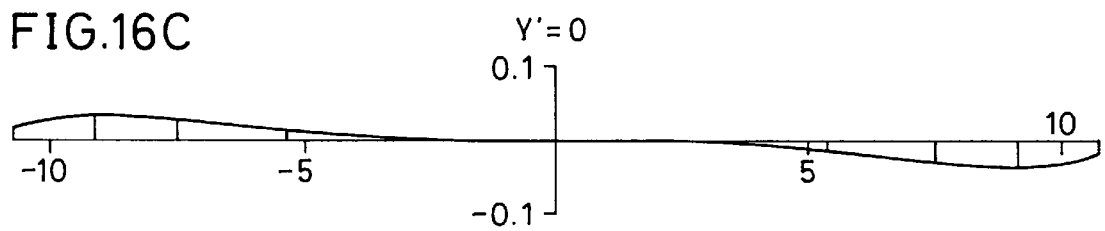
Figure 17A:
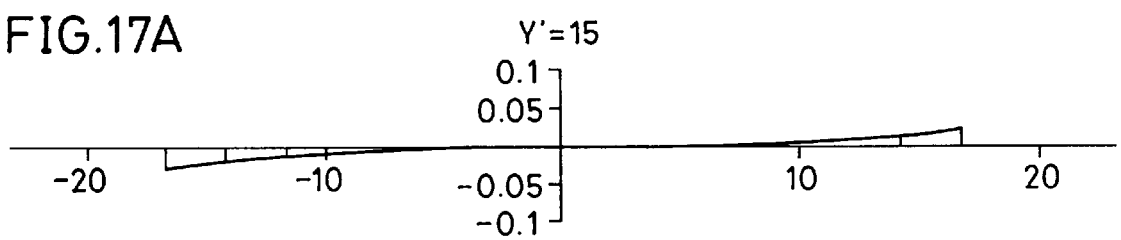
FIGS. 17A and 17B show meridional lateral aberrations of the second embodiment at the longest focal length condition before decentering.
Figure 17B:
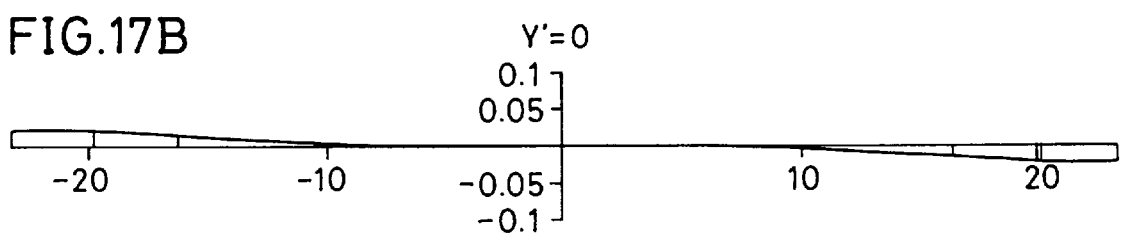
Figure 18A:
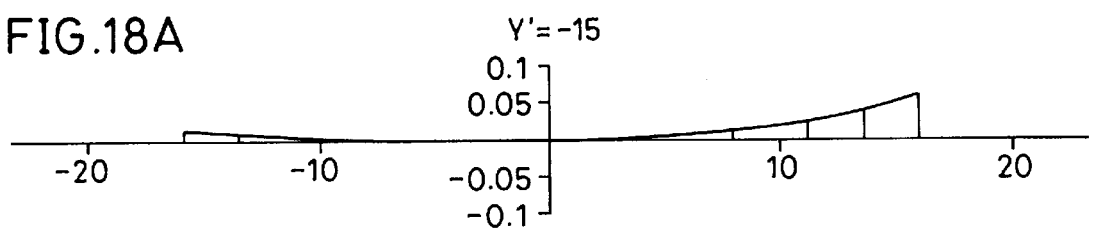
FIGS. 18A to 18C show meridional lateral aberrations of the second embodiment at the longest focal length condition after decentering.
Figure 18B:
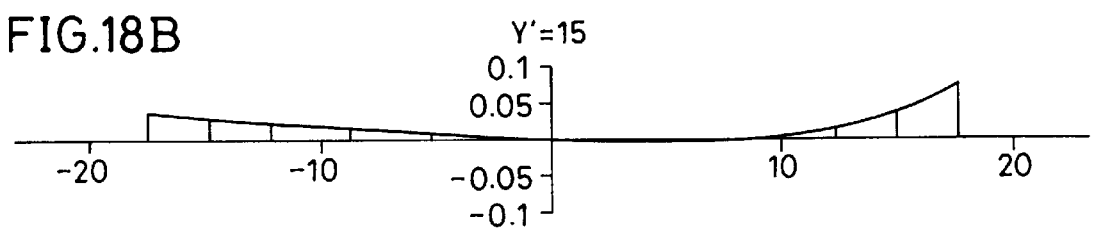
Figure 18C:
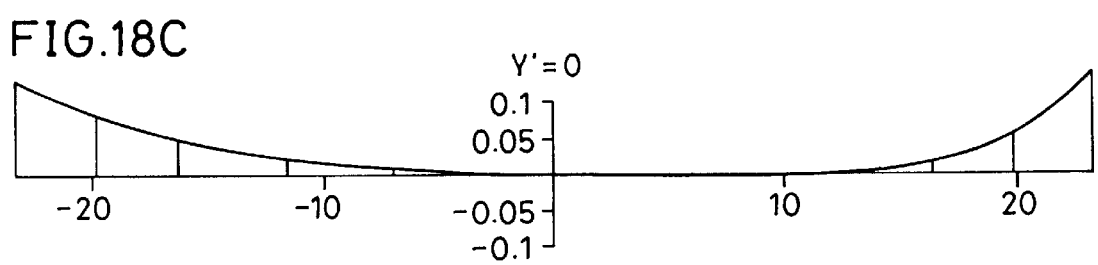
Figure 19A:
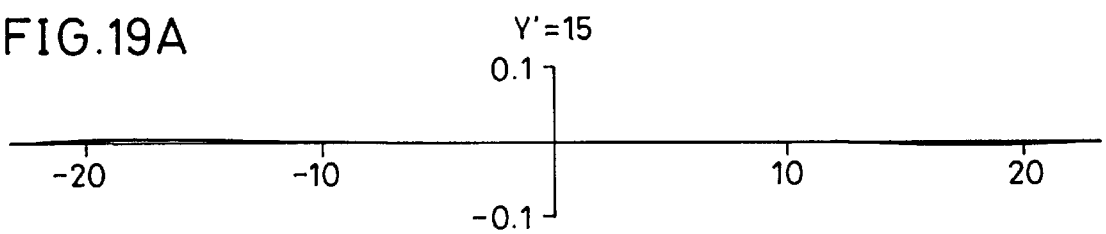
FIGS. 19A and 19B show sagittal lateral aberrations of the second embodiment at the longest focal length condition before decentering.
Figure 19B:
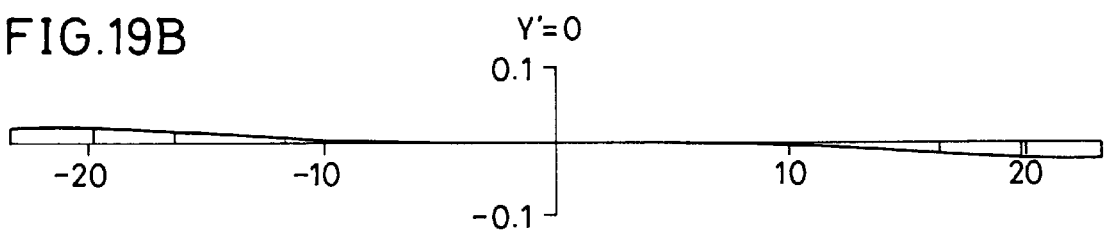
Figure 20A:
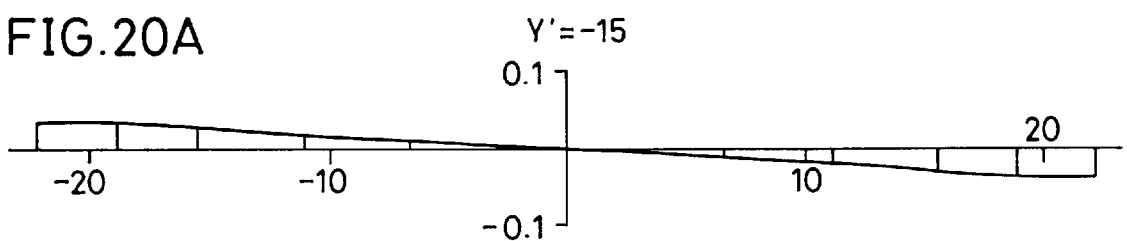
FIGS. 20A to 20C show sagittal lateral aberrations of the second embodiment at the longest focal length condition after decentering.
Figure 20B:
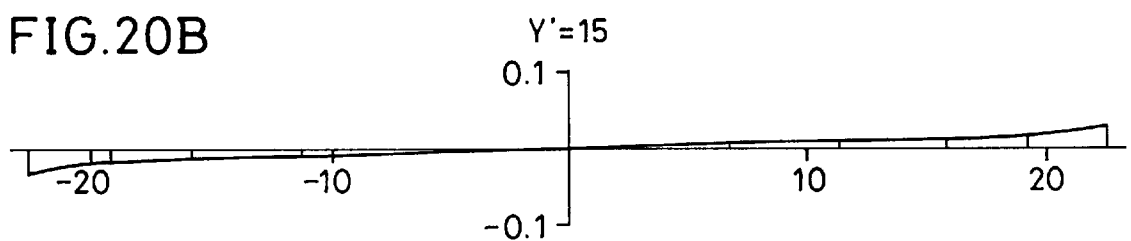
Figure 20C:
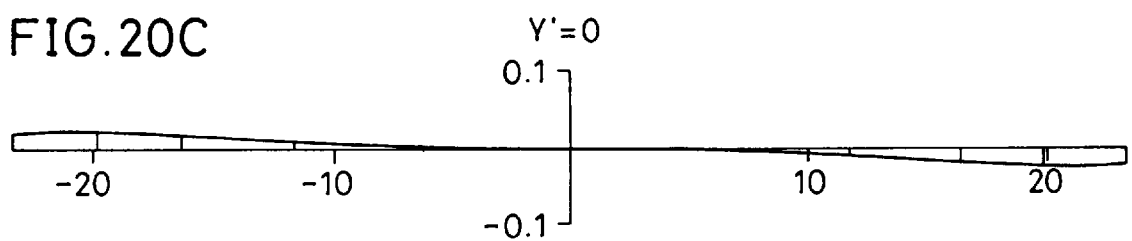
Figure 21:
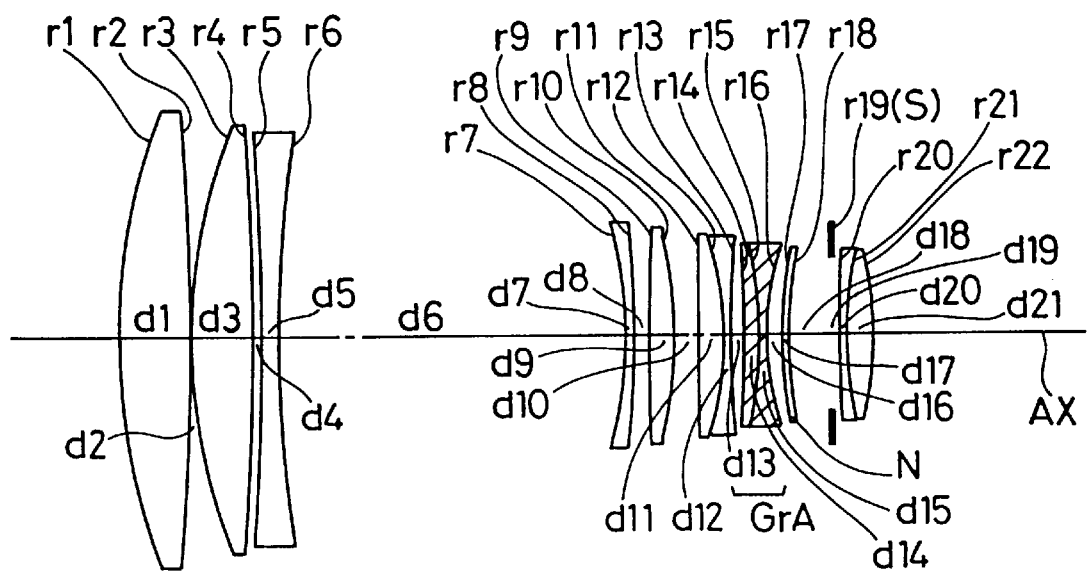
FIG. 21 shows the lens arrangement of a third embodiment of the present invention.
Figure 23A:
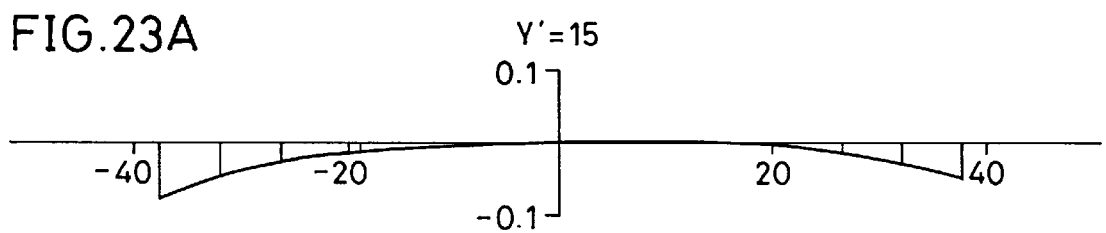
FIGS. 23A and 23B show meridional lateral aberrations of the third embodiment before decentering.
Figure 23B:
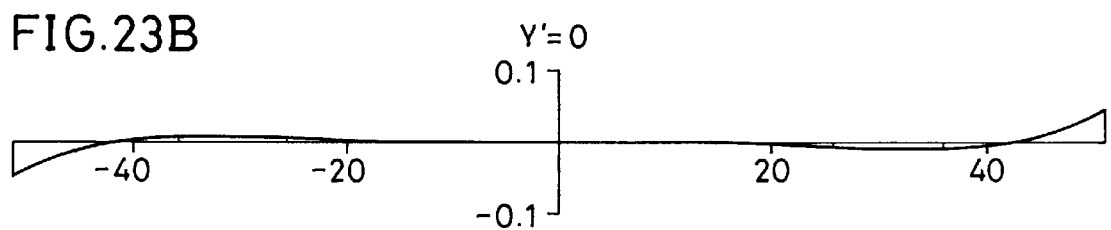
Figure 24A:
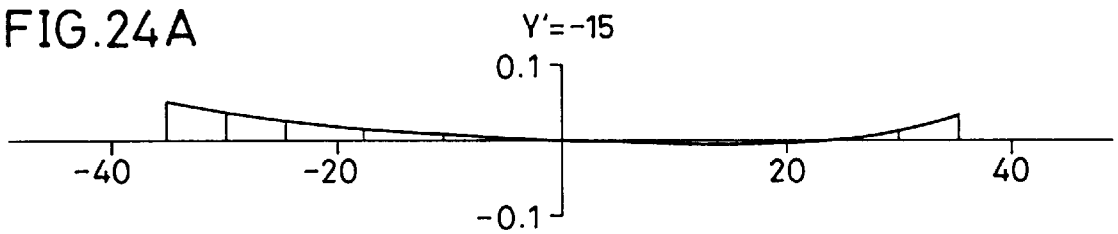
FIGS. 24A to 24C show meridional lateral aberrations of the third embodiment after decentering.
Figure 24B:
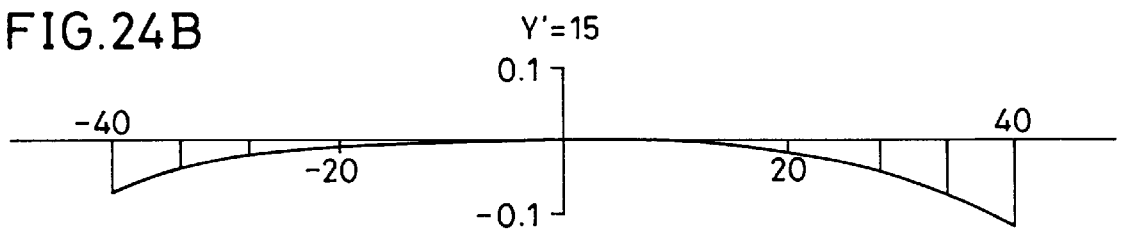
Figure 24C:
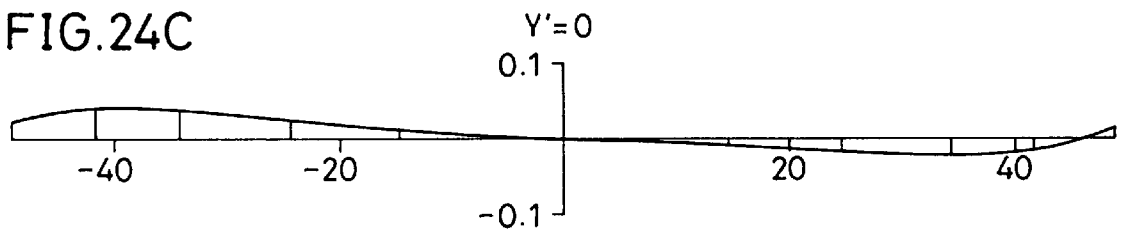
Figure 25A:
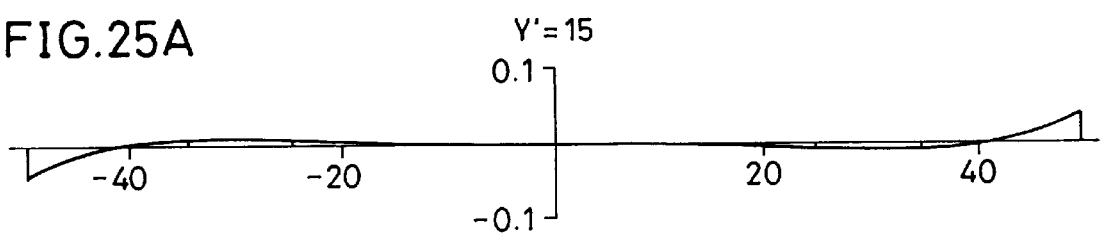
FIGS. 25A and 25B show sagittal lateral aberrations of the third embodiment before decentering.
Figure 25B:
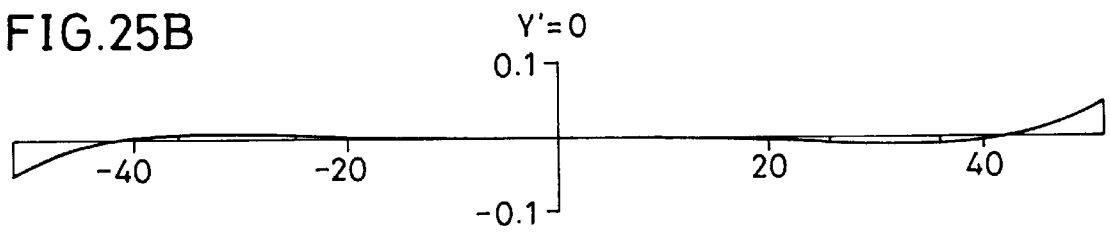
Figure 26A:
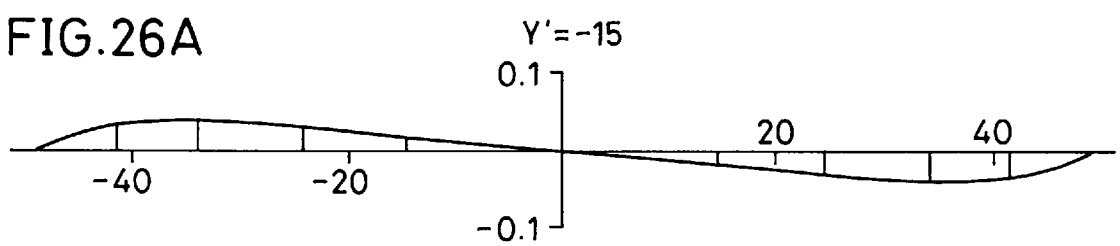
FIGS. 26A to 26C show sagittal lateral aberrations of the third embodiment after decentering.
Figure 26B:
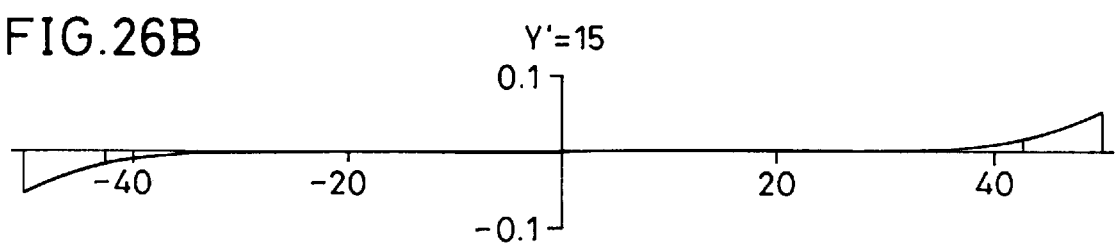
Figure 26C:
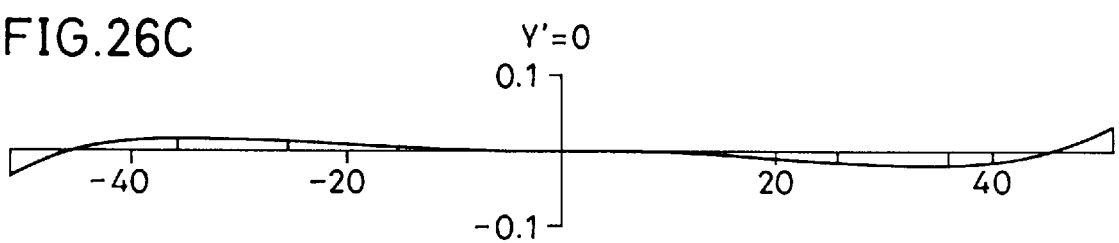
Figure 27:
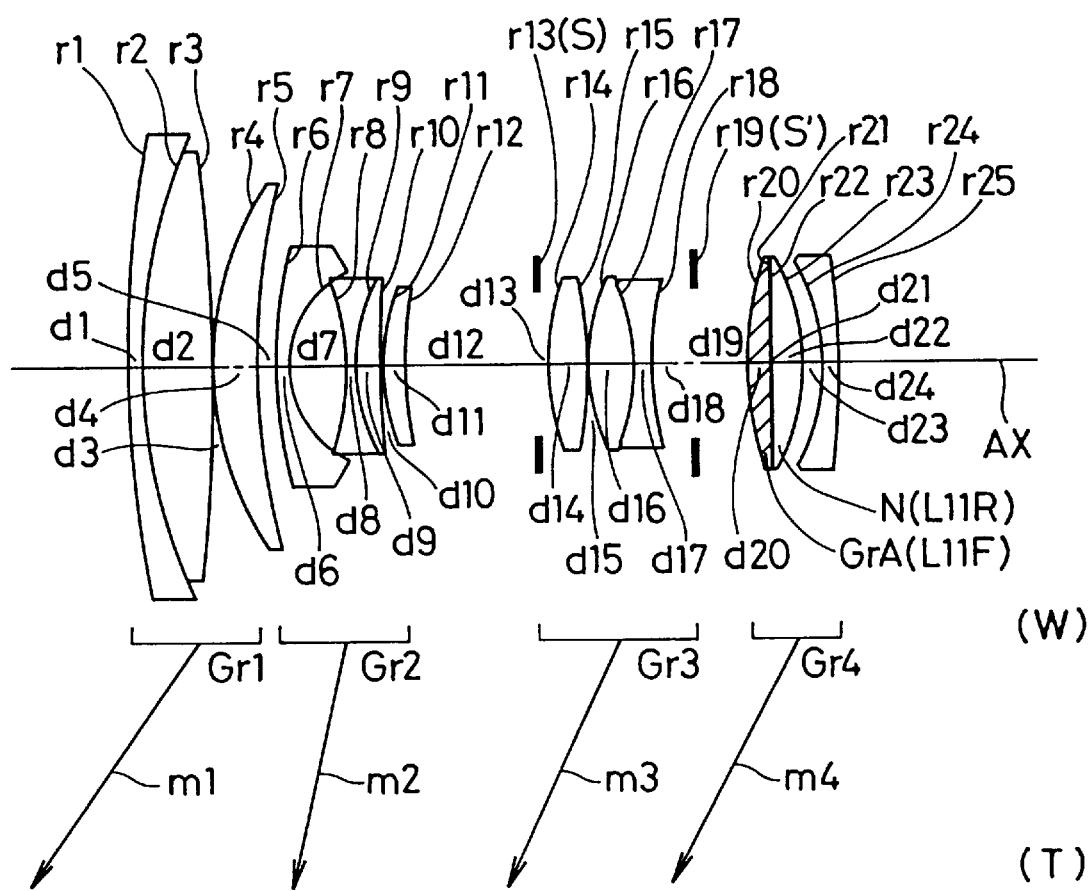
FIG. 27 shows the lens arrangement of the fourth embodiment of the present invention.
Figure 28A:
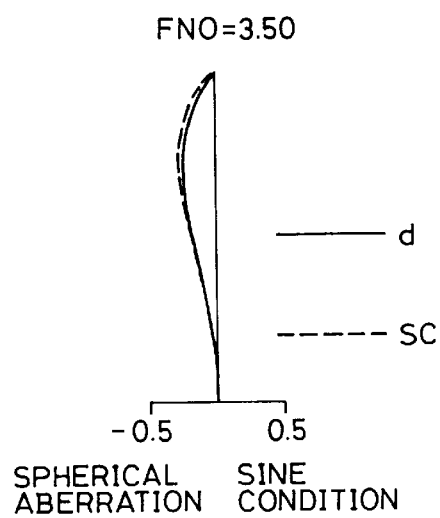
FIGS. 28A to 28C show longitudinal aberrations of the fourth embodiment before decentering at the shortest focal length condition.
Figure 28B:
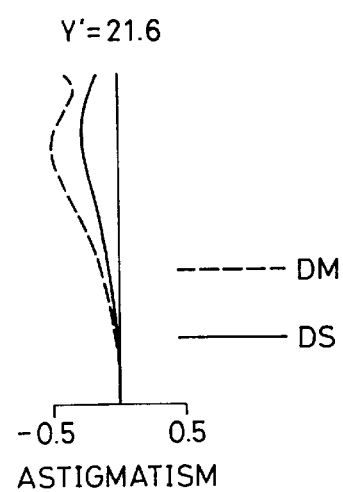
Figure 28C:
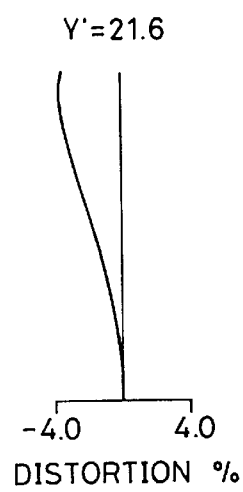
Figure 28D:
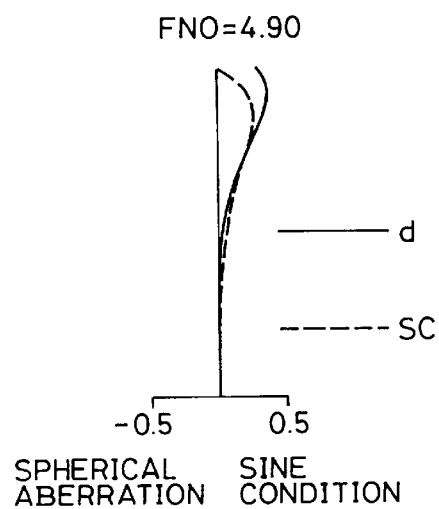
FIGS. 28D to 28F show longitudinal aberrations of the fourth embodiment before decentering at the longest focal length condition.
Figure 28E:
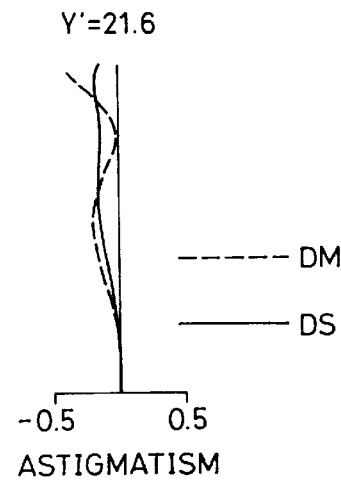
Figure 28F:
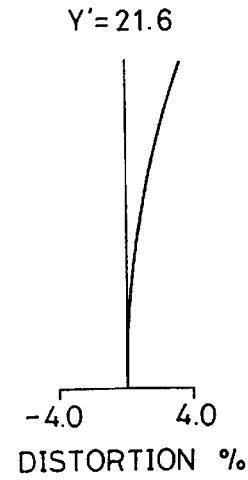
Figure 29A:
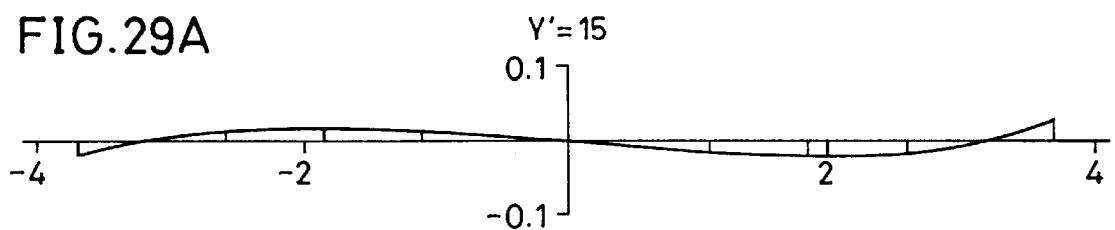
FIGS. 29A and 29B show meridional lateral aberrations of the fourth embodiment at the shortest focal length condition before decentering.
Figure 29B:
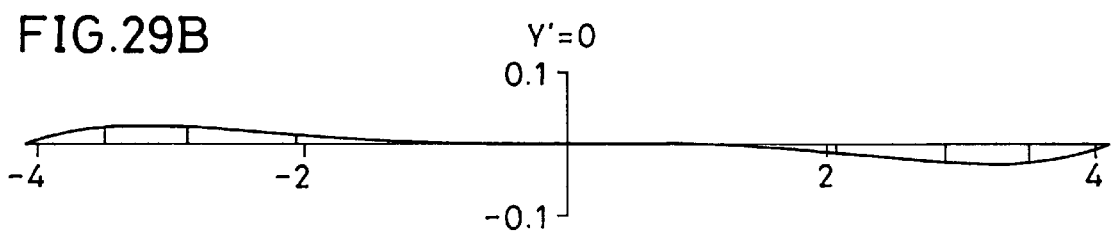
Figure 30A:
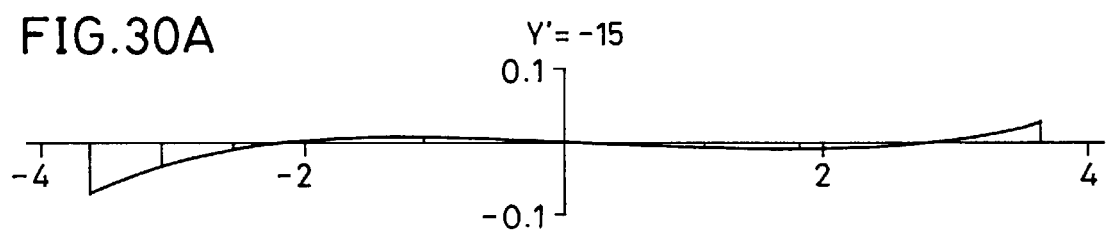
FIGS. 30A to 30C show meridional lateral aberrations of the fourth embodiment at the shortest focal length condition after decentering.
Figure 30B:
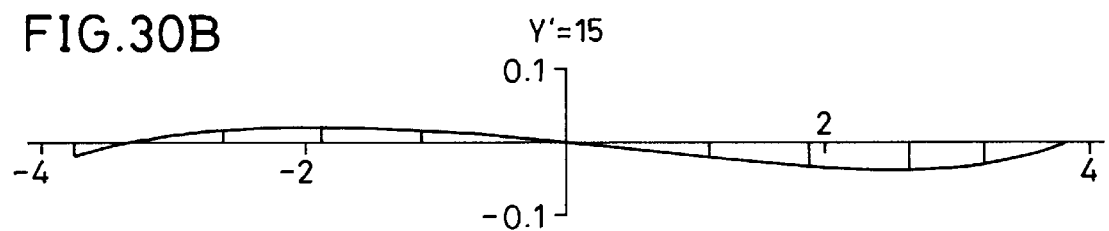
Figure 30C:
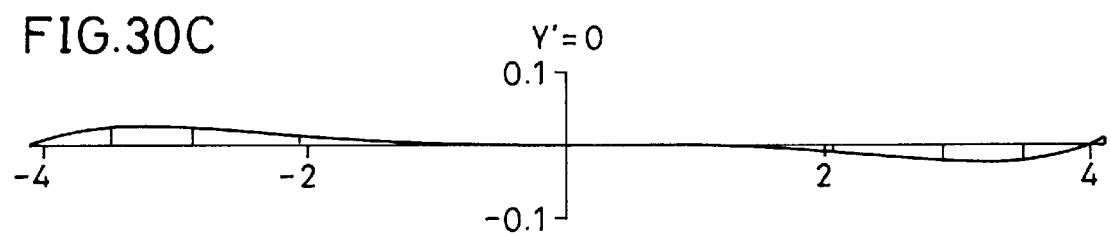
Figure 31A:
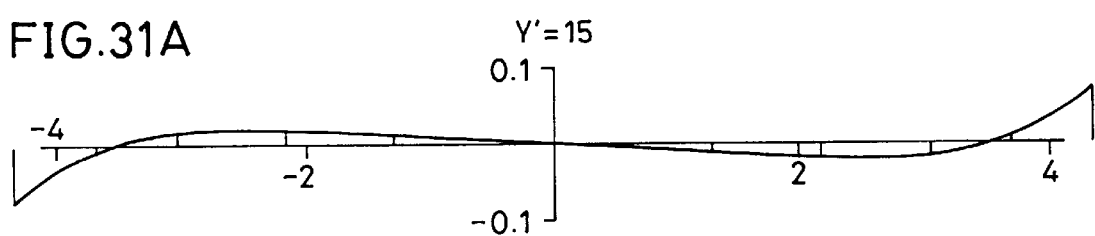
FIGS. 31A and 31B show sagittal lateral aberrations of the fourth embodiment at the shortest focal length condition before decentering.
Figure 31B:
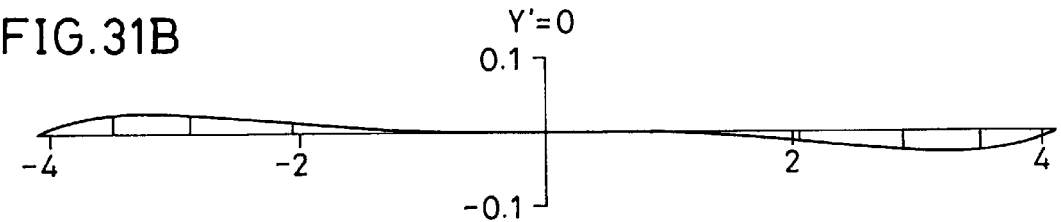
Figure 32A:
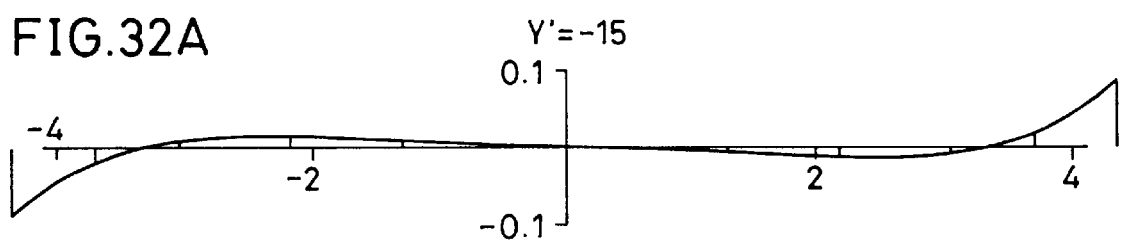
FIGS. 32A to 32C show sagittal lateral aberrations of the fourth embodiment at the shortest focal length condition after decentering.
Figure 32B:
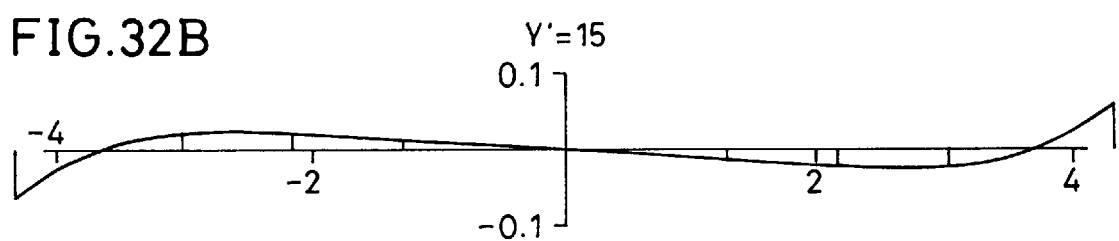
Figure 32C:
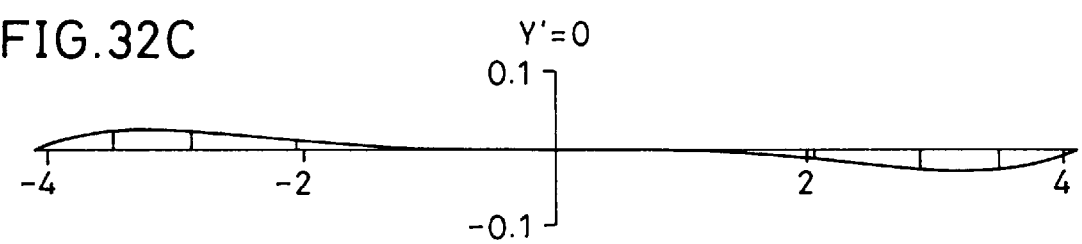
Figure 33A:
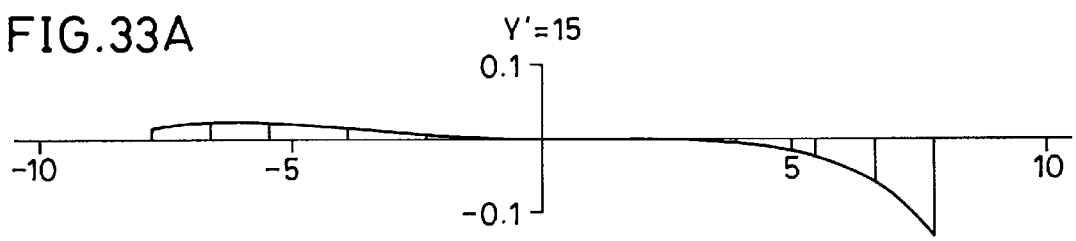
FIGS. 33A and 33B show meridional lateral aberrations of the fourth embodiment at the longest focal length condition before decentering.
Figure 33B:
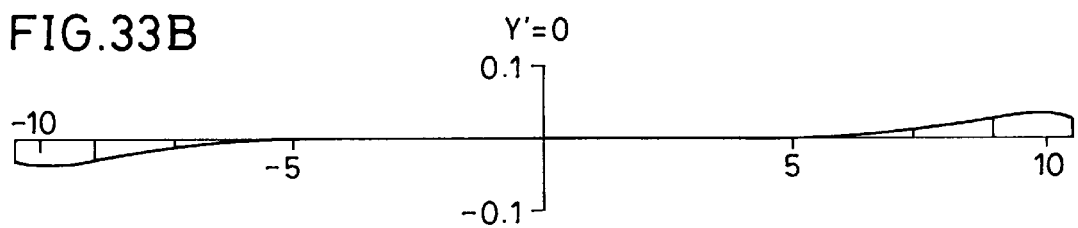
Figure 34A:
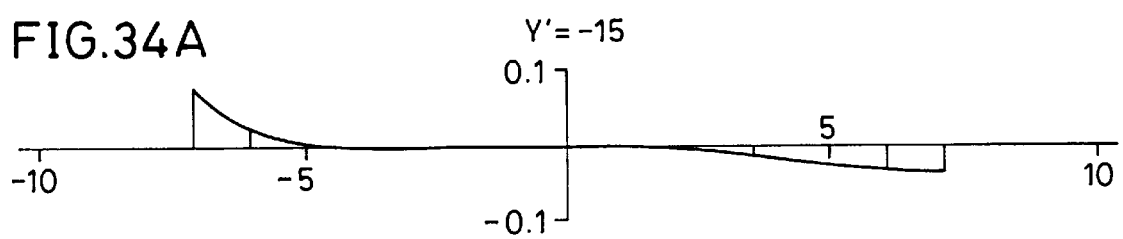
FIGS. 34A to 34C show meridional lateral aberrations of the fourth embodiment at the longest focal length condition after decentering.
Figure 34B:
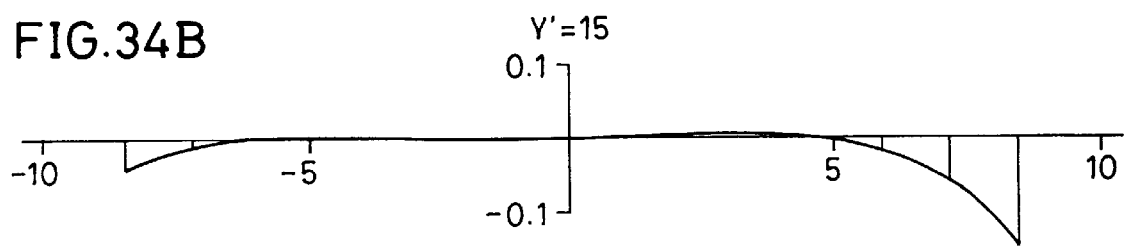
Figure 34C:
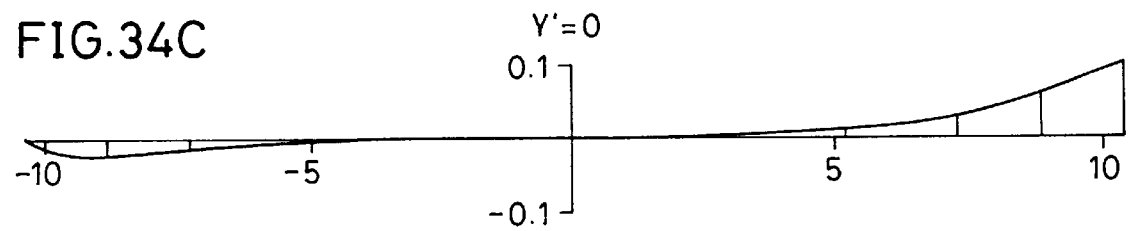
Figure 35A:
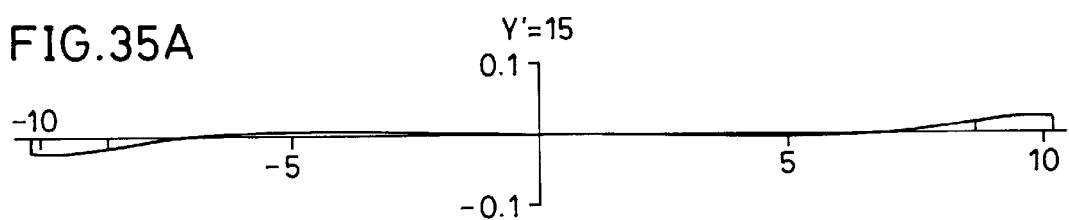
FIGS. 35A and 35B show sagittal lateral aberrations of the fourth embodiment at the longest focal length condition before decentering.
Figure 35B:
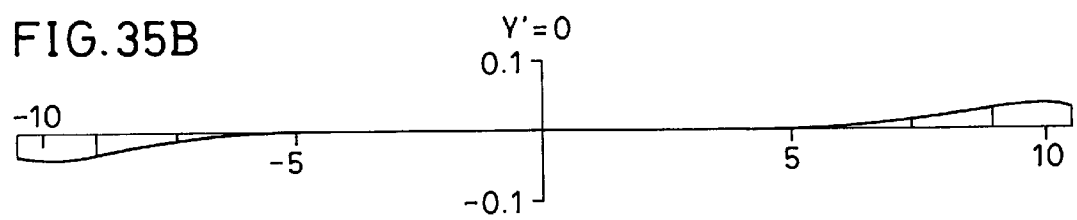
Figure 36A:
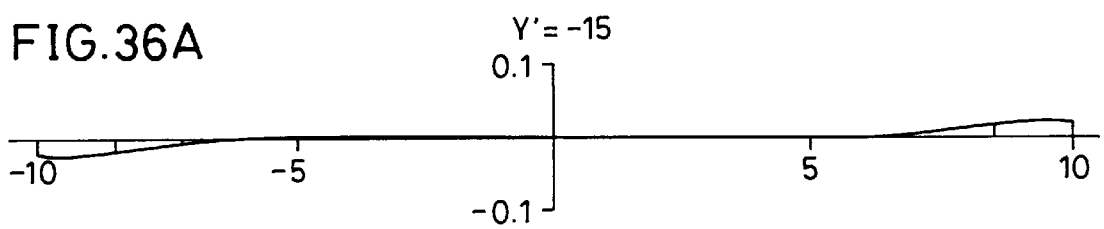
FIGS. 36A to 36C show sagittal lateral aberrations of the fourth embodiment at the longest focal length condition after decentering.
Figure 36B:
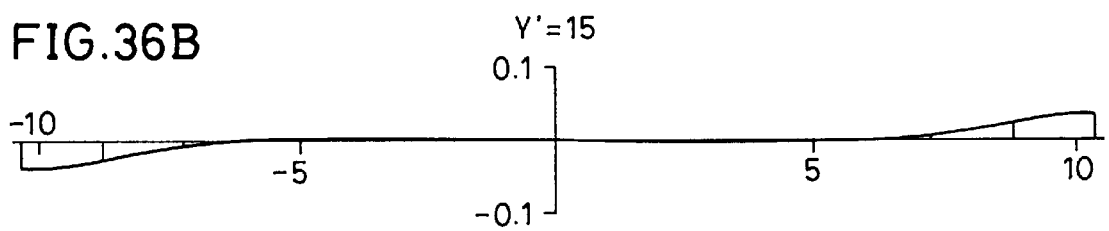
Figure 36C:
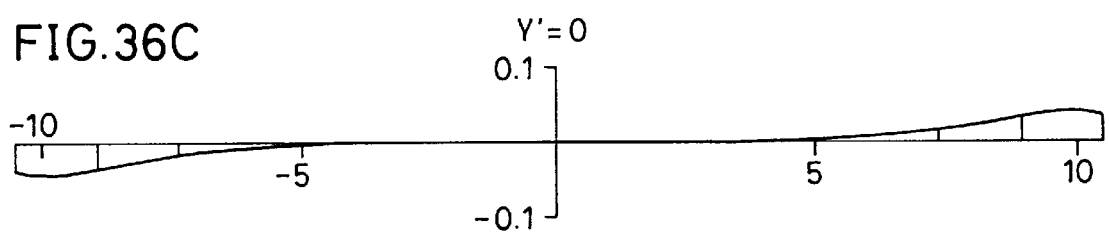

FIGS. 1, 11, 21 and 27 show the lens arrangements of the first to fourth embodiments. The first embodiment (FIG. 1), the second embodiment (FIG. 11) and the fourth embodiment (FIG. 27) are zoom lens systems, and the third embodiment (FIG. 21) is a fixed focal length telephoto lens system (in each figure, AX represent the optical axis). With respect to the zoom lens systems, FIGS. 1, 11 and 27 show the lens arrangements at the shortest focal length condition (W). Arrows m1, m2, m3 and m4 in the figures schematically show the movements of a first lens unit Gr1, a second lens unit Gr2, a third lens unit Gr3 and a fourth lens unit Gr4 from the shortest focal length condition (W) to the longest focal length condition (T), respectively.

The first to third embodiments are embodiments according to the first implementation and are optical systems including a compensating lens unit GrA capable of decentering for camera shake compensation and a lens (hereinafter, referred to as "non-decentering lens") N located closer to the image than the compensating lens unit GrA and not decentering in camera shake compensation, and an aperture stop S. In the compensating lens unit GrA, an aspherical surface is formed. In the non-decentering lens N not decentering in camera shake compensation, an aspherical surface is formed which tends to counteract the aspherical effect of the aspherical surface formed in the compensating lens unit GrA. In addition, the previously-described conditions (1) and (2) are fulfilled as shown in Table 6.

The first, second and fourth embodiments are embodiments according to the second implementation and are zoom lens systems including four lens units Gr1 to Gr4 and performing zooming by varying the distances between the lens units. Further, the following are included: a compensating lens unit GrA located in a lens unit (i.e. the second lens unit Gr2 or the third lens unit Gr3 or the fourth lens unit Gr4) other than the most object side lens unit (i.e. the first lens unit Gr1) and capable of decentering for camera shake compensation; and a lens N located closer to the image than the compensating lens unit GrA. In the compensating lens unit GrA, an aspherical surface is formed. In the lens N not decentering in camera shake compensation, an aspherical surface is formed which tends to counteract the aspherical effect of the aspherical surface formed in the compensating lens unit GrA.

Description of the First Embodiment

The first embodiment comprises from the object side:

a first lens unit Gr1 including a negative meniscus lens element concave to the image side, a positive bi-convex lens element, and a positive meniscus lens element convex to the object side;

a second lens unit Gr2 including a doublet lens element (hatched portion; this constitutes the compensating lens unit GrA) consisting of a positive meniscus lens element convex to the image side and a negative bi-concave lens element (whose image side surface is aspherical), and a positive bi-convex lens element (this constitutes the non-decentering lens N and its object side surface is aspherical);

a third lens unit Gr3 including an aperture stop S, a negative meniscus lens element concave to the image side, and two positive bi-convex lens elements; and a fourth lens unit Gr4 including a negative meniscus lens element concave to the image side, and a doublet lens element consisting of a positive meniscus lens element convex to the image side and a negative meniscus lens element concave to the object side.

The first and second embodiments are four-unit zoom lens systems of positive, negative, positive, negative configuration which are new and very compact as telephoto type lens systems. In the first embodiment, in the four-unit zoom lens system of positive, negative, positive, negative configuration, the negative doublet lens element in the negative second lens unit Gr2 is used as the compensating lens unit GrA and its image side surface is aspherical. The displacement direction of the aspherical surface relative to the reference surface is a direction such that the surface displaces toward the object side from the optical axis to the edge along the height. Therefore, the aspherical surface of the compensating lens unit GrA is a positive aspherical surface where the negative power decreases (compared to spherical surfaces) from the center to the edge along the height.

The aspherical surface for counteracting the effect of the aspherical surface of the compensating lens unit GrA is formed on the object side of the positive bi-convex lens element of the second lens unit Gr2 which is located right on the image side of the negative doublet lens element. The aspherical surface is a negative aspherical surface having a displacement in a direction to counteract the effect of the aspherical surface of the compensating lens unit GrA. Since the bi-convex lens element used as the non-decentering lens N is arranged in the same lens unit as the lens unit in which the doublet lens element used as the compensating lens unit GrA is arranged, the distance between the compensating lens unit GrA and the non-decentering lens N does not vary during zooming. Further, the compensating lens unit GrA and the non-decentering lens N adjoin each other and their aspherical surfaces face each other and are in a closest positional relationship. Therefore, the decentering aberrations in camera shake compensation can be excellently corrected, and by the aspherical surface of the bi-convex lens element, the aberrations in the normal condition are returned to excellent condition in the entire zoom range.

The reason why a doublet lens element consisting of two lens elements is used as the compensating lens unit GrA is that if the compensating lens unit GrA includes only one negative lens element, axial lateral chromatic aberration is largely generated due to the decentering in camera shake compensation. Therefore, in order to restrain the axial lateral chromatic aberration, the camera shake compensating lens unit GrA necessarily includes a plurality of lens elements. However, if the number of lens elements of the compensating lens unit GrA is too large, its weight increases, so that a large driving mechanism is necessary to quickly decenter the compensating lens unit GrA for camera shake compensation. Therefore, it is the most desirable that the compensating lens unit GrA should include two lens elements.

When the compensating lens unit GrA includes two lens elements (including a doublet lens element) and has a negative refractive power like in the first embodiment, it is preferable that the compensating lens unit GrA includes a positive lens element with an Abbe number of $v_d < 35$ and a negative lens element with an Abbe number of $v_d > 40$.

Description of the Second Embodiment

The second embodiment comprises from the object side:

a first lens unit Gr1 including a negative meniscus lens element concave to the image side, a positive bi-convex lens element, and a positive meniscus lens element convex to the object side;

a second lens unit Gr2 including a negative bi-concave lens element, a positive bi-convex lens element (hatched portion; this constitutes the compensating lens unit GrA and its image side surface is aspherical), and a positive meniscus lens element convex to the object side (this constitutes the non-decentering lens N and its object side surface is aspherical);

a third lens unit Gr3 including an aperture stop S, a negative meniscus lens element concave to the image side, and two positive bi-convex lens elements; and a fourth lens unit Gr4 including a negative bi-concave lens element, and a doublet lens element consisting of a positive meniscus lens element convex to the image side and a negative meniscus lens element concave to the object side.

In the second embodiment, the second lens unit (from the object side, this lens unit includes a negative lens element and a positive lens element) of the basic four-unit zoom lens system of positive, negative, positive, negative configuration is used as the compensating lens unit GrA and the image side surface of the positive lens element in the negative second lens unit is aspherical, so that the generation of axial coma in camera shake compensation is restrained to be small.

For example, if the aspherical surface of the non-decentering lens N is formed in the positive third lens unit Gr3, the aspherical surface is largely away from the aspherical surface of the second lens unit Gr2 used as the compensating lens unit GrA and the distance $d_{ASP}$ between the two aspherical surfaces relatively varies during zooming, so that it is impossible to return the aberrations in the normal condition to excellent condition in the entire zoom range. In this embodiment, in order to return the aberrations in the normal condition to excellent condition, a non-decentering lens N which hardly has any power is arranged closer to the image than the compensating lens unit GrA of the negative second lens unit Gr2 and an aspherical surface is formed therein.

Since the non-decentering lens N adjoin the compensating lens unit GrA and moves simultaneously therewith, in the second embodiment, the optimum power arrangement is changed if the non-decentering lens N has a high power. Therefore, in the lens arrangement like that of the second embodiment, the following condition (5) is preferably fulfilled:

$$\left|\frac{\phi_N}{\phi_A}\right| < 0.35 \tag{5}$$

where $\phi_N$ is the power of the non-decentering lens N and $\phi_A$ is the power of the compensating lens unit GrA.

Description Common to the First and Second Embodiments

In both the first and second embodiments, the power $\phi_A$ of the compensating lens unit GrA relates to how much the compensating lens unit GrA is decentered to perform a camera shake compensation of a predetermined angle. If the power $\phi_A$ of the compensating lens unit GrA is high, camera shake compensation is made with a large compensation angle θ only by slightly decentering the compensating lens unit GrA. In that case, however, since it is necessary to decenter the compensating lens unit GrA with an extremely high accuracy, the cost of the mechanism for driving the compensating lens unit GrA increases. Conversely, if the power $\phi_A$ of the compensating lens unit GrA is weak, although less accuracy is required for the decentering, the decentering amount of the compensating lens unit GrA necessary for a compensation of a predetermined angle increases, so that the sizes of the compensating lens unit and its driving mechanism both increase. Therefore, with respect to the power $\phi_A$ of the compensating lens unit GrA, the following condition (6) is preferably fulfilled:

$$1.5 < \left|\frac{\phi_A}{\phi_T}\right| < 12.5 \tag{6}$$

where $\phi_T$ is the power of the entire lens system at the longest focal length condition.

Here, a case will be examined where the camera shake compensating system is employed for the four-unit telephoto zoom lens system of positive, negative, positive, negative configuration disclosed in Japanese Laid-open Patent Application No. H1-197713. The negative second lens unit of this zoom lens system comprises from the object side a negative lens element and a positive lens element. When this lens unit is used as the compensating lens unit GrA, the decentering aberrations other than axial coma generated in camera shake compensation are excellently corrected (1) when only the negative lens element is used and (2) when both the negative and positive lens elements are used. However, in a camera shake compensation of a compensation angle θ of 0.7°, axial coma is 240 μm in the case of (1) and 320 μm in the case of (2), which are ten or more times as large as the permissible aberration amount.

Description of the Third Embodiment

The third embodiment comprises from the object side two positive bi-convex lens element, a negative bi-concave lens element, a negative meniscus lens element concave to the object side, a positive bi-convex lens element, a doublet lens element consisting of a positive meniscus lens element convex to the image side and a negative bi-concave lens element, a doublet lens element (hatched portion; this constitutes the compensating lens unit GrA) consisting of a positive meniscus lens element convex to the image side and a negative bi-concave lens element (whose image side surface is aspherical), a negative meniscus lens element concave to the image side (this constitutes the non-decentering lens N and its object side surface is aspherical), an aperture stop S, and a doublet lens element consisting of a negative meniscus lens element concave to the image side and a positive bi-convex lens element.

Although the third embodiment is a fixed focal length lens system, the workings, associated with camera shake compensation, of the compensating lens unit GrA, the non-decentering lens N and their aspherical surfaces are similar to those of the first and second embodiments. Specifically, when the image side doublet lens element is used as the compensating lens unit GrA as described above, of the decentering aberrations generated in camera shake compensation, axial coma is very largely generated. This axial coma is restrained by using an aspherical surface as the image side surface of the doublet lens element, arranging in close vicinity thereto the non-decentering lens N which hardly has any power to counteract the effect of the aspherical surface of the doublet lens element and forming an aspherical surface in the non-decentering lens N. Further, in this embodiment, by using a doublet lens element consisting of two lens elements as the compensating lens unit GrA, the generation of axial lateral chromatic aberration is restrained in camera shake compensation.

Description of the Fourth Embodiment

The fourth embodiment comprises from the object side:

a first lens unit Gr1 including a doublet lens element consisting of a negative meniscus lens element concave to the image side and a positive bi-convex lens element, and a positive meniscus lens element convex to the object side;

a second lens unit Gr2 including a negative meniscus lens element concave to the image side (whose object side surface is aspherical), a doublet lens element consisting of a negative bi-concave lens element and a positive lens element convex to the object side, and a positive meniscus lens element convex to the object side;

a third lens unit Gr3 including an aperture stop S, a positive bi-convex lens element, a doublet lens element consisting of a positive bi-convex lens element and a negative bi-concave lens element, and a light restricting plate S'; and a fourth lens unit Gr4 including a plano-convex lens element L11F convex to the object side (hatched portion; this constitutes the compensating lens unit GrA and its image side surface is aspherical), a plano-convex lens element L11R convex to the image side (this constitutes the non-decentering lens N and its object side surface is aspherical), and a negative meniscus lens element L12 concave to the object side (whose object side surface is aspherical).

The fourth embodiment is a four-unit high-magnification standard zoom lens system of positive, negative, positive, positive configuration. The aperture S is included in the third lens unit Gr3 of a positive power. The lens diameters of the lens units Gr2 to Gr4 other than the first lens unit Gr1 are all small. The working of the fourth embodiment associated with camera shake compensation is also similar to the first to third embodiments. Specifically, by dividing the positive element of the positive fourth lens unit Gr4 into the lens element L11F and the lens element L11R from the object side to use the lens L11F as the compensating lens unit GrA and the lens L11R as the non-decentering lens N and by using aspherical surfaces which counteract each other as the image side surface of the lens L11F and as the object side surface of the lens L11R, axial coma on the longer focal length side is reduced to excellently correct the decentering aberrations in camera shake compensation.

Figure 37A:
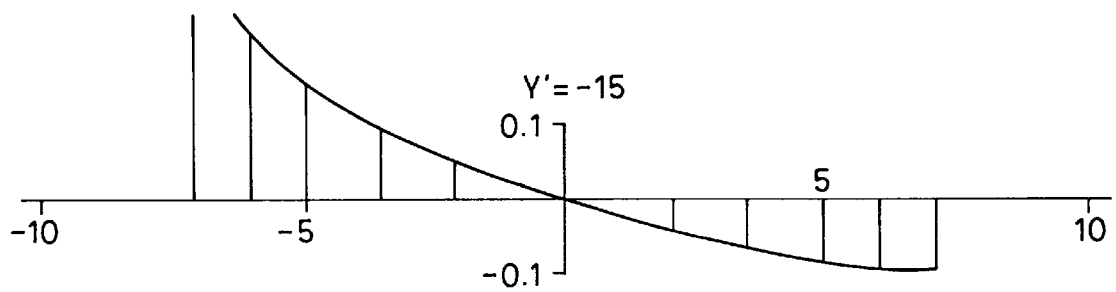
FIGS. 37A to 37C show meridional lateral aberrations of the fourth embodiment at the longest focal length condition after decentering when no aspherical surfaces are provided in the compensating lens unit and the non-decentering lens.
Figure 37B:
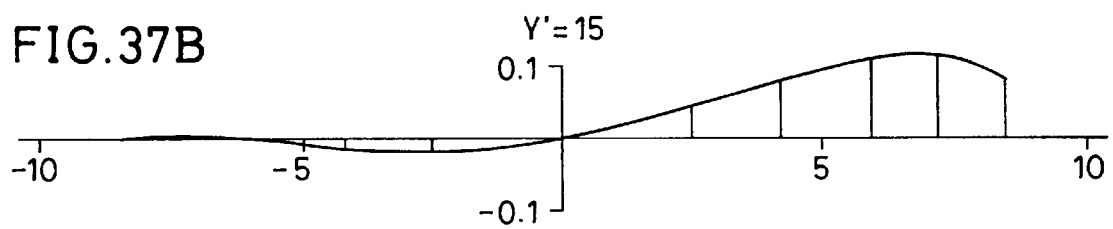
Figure 37C:
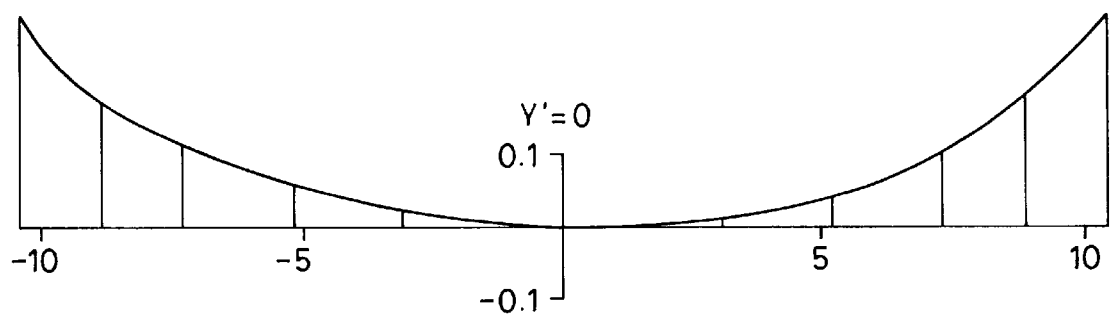
Figure 38A:
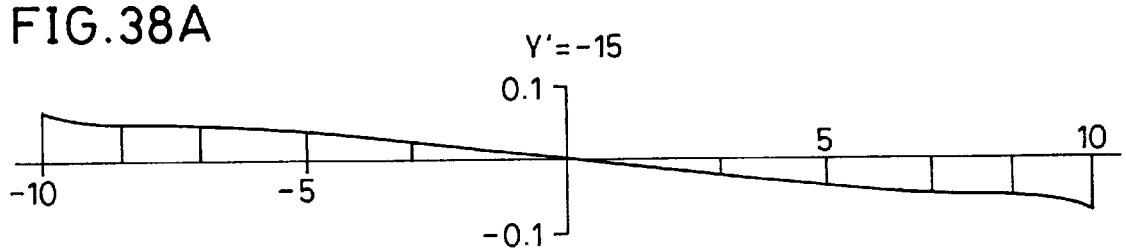
FIGS. 38A to 38C show sagittal lateral aberrations of the fourth embodiment at the longest focal length condition after decentering when no aspherical surfaces are provided in the compensating lens unit and the non-decentering lens.
Figure 38B:
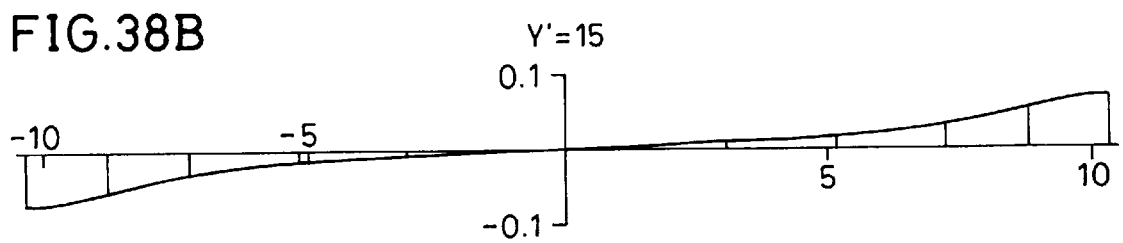
Figure 38C:
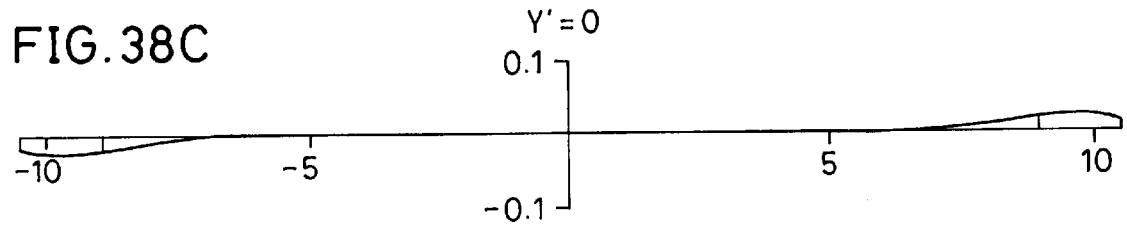

Since, simply by dividing the positive lens element of the fourth lens unit Gr4 into the lens elements L11F and L11R to use the lens L11F as the compensating lens unit GrA, axial coma is very large, the decentering aberrations generated in camera shake compensation cannot be excellently corrected. FIGS. 37 and 38 show lateral aberrations generated in camera shake compensation when no aspherical surfaces are formed on the lens elements L11F and L11R.

In the fourth embodiment, the compensating lens unit GrA includes only one lens element unlike the first and second embodiments. This is because the lateral chromatic aberration generated in camera shake compensation causes no problem since the fourth embodiment is a standard zoom lens system whose longest focal length is at most 103 mm. Still, it is necessary to reduce the lateral chromatic aberration to some degree. To do so, it is preferable that the Abbe number $v_d$ of the compensating lens unit GrA is 50 or more.

FIGS. 2A to 2F, 12A to 12F, 22A to 22C and 28A to 28F show longitudinal aberrations of the first to fourth embodiments in the normal condition (pre-decentering condition). FIGS. 2A to 2C, 12A to 12C and 28A to 28C show aberrations at the shortest focal length condition. FIGS. 2D to 2F, 12D to 12F and 28D to 28F show aberrations at the longest focal length condition. The solid line d represents aberration to the d-line, the broken line SC represents sine condition. The broken line DM and the solid line DS show astigmatisms to the d-line on the meridional and sagittal image planes, respectively.

FIGS. 3A to 3B, 4A to 4C, 5A to 5B, 6A to 6C, 7A to 7B, 8A to 8C, 9A to 9B and 10A to 10C show lateral aberrations of the compensating lens unit GrA of the first embodiment before and after decentering. FIGS. 13A to 13B, 14A to 14C, 15A to 15B, 16A to 16C, 17A to 17B, 18A to 18C, 19A to 19B and 20A to 20C show lateral aberrations of the compensating lens unit GrA of the second embodiment before and after decentering. FIGS. 23A to 23B, 24A to 24C, 25A to 25B and 26A to 26C show lateral aberrations of the compensating lens unit GrA of the third embodiment before and after decentering. FIGS. 29A to 29B, 30A to 30C, 31A to 31B, 32A to 32C, 33A to 33B, 34A to 34C, 35A to 35B and 36A to 36C show lateral aberrations of the compensating lens unit GrA of the fourth embodiment before and after decentering. The aberrations of the compensating lens unit GrA after decentering are aberrations under a compensated condition where the compensating lens unit GrA is decentered at a camera shake compensation angle e of 0.70.

The values corresponding to the conditions (1) to (6) are shown in Table 6 with respect to the first to fourth embodiments.

As described above, according to the first to the fourth embodiments, since an aspherical surface is formed in the compensating lens unit GrA, the decentering aberrations such as axial coma are corrected, and since an aspherical surface which tends to counteract the aspherical effect of the aspherical surface of the compensating lens unit GrA is formed in the non-decentering lens N, aberrations generated in the normal condition are maintained excellent. Thus, aberrations are excellently corrected both in the normal condition and in the compensated condition. Further, according to the first to fourth embodiments, compared to the zoom lens system proposed by the previously-mentioned Japanese Laid-open Patent Application No. H6-123836 (assuming that the camera shake compensating angles θ are the same), axial coma is restrained to a fraction, and when a large camera shake occurs, image degradation in compensation is very small.

Further, according to the first to third embodiments, since off-axial image point movement error is restrained to be small by fulfilling the condition (1) and the condition (2) is further fulfilled, the weight and size of the compensating lens unit GrA are reduced to reduce the size of the entire optical system. Since it is unnecessary for the driving mechanism to have a great power because of the size reduction of the optical system, the size of the entire lens barrel can be reduced.

According to the first, second and fourth embodiments, although aberrations are excellently corrected both in the normal and compensated conditions in the entire zoom range from the shortest focal length condition (W) to the longest focal length condition (T), since the compensating lens unit GrA is located in the lens unit Gr2 or Gr3 or Gr4 other than the first lens unit Gr1, not only the size of the compensating lens unit GrA but also the size of the driving mechanism necessary for its decentering can be reduced, so that the entire optical system having the camera shake compensating function can be reduced.

As described above, according to the optical systems having a camera shake compensating function of the first and second implementations, since an aspherical surface is formed in the compensating lens unit capable of decentering for camera shake compensation, decentering aberrations such as axial coma is corrected, and since an aspherical surface which tends to counteract the aspherical effect of the aspherical surface formed in the compensating lens unit is formed in a lens located closer to the image than the compensating lens unit and not decentering in camera shake compensation, aberrations in the normal condition are maintained excellent. Thus, aberrations are excellently corrected both in the normal condition and in the compensated condition.

Further, according to the optical system having a camera shake compensating function of the first implementation, since off-axial image point error is restrained to be small by fulfilling the condition (1) and the condition (2) is further fulfilled, the weight and size of the compensating lens unit can be reduced to reduce the size of the entire optical system. Since it is unnecessary for the driving mechanism to have a great power because of the reduction in size of the compensating lens unit, the size of the entire lens barrel can be reduced.

Moreover, according to the optical system having a camera shake compensating function of the second implementation, since the compensating lens unit is located in a lens unit other than the most object side lens unit, not only the size of the compensating lens unit but also the size of the driving mechanism necessary for the decentering can be small, so that the size of the entire optical system having a camera shake compensating function can be reduced.

Obviously, many modifications and variations of the present invention are possible in light of the above teachings. It is therefore to be understood that within the scope of the appended claims, the invention may be practiced other than as specifically described.

TABLE 1

| Refractive Index | Displacement Direction of Aspherical Surface | Type of Aspherical Surface |
|---|---|---|
| Object side > Image side | Toward object side | Positive aspherical surface |
| Object side < Image side | Toward object side | Negative aspherical surface |
| Object side > Image side | Toward image side | Negative aspherical surface |
| Object side < Image side | Toward image side | Positive aspherical surface |

TABLE 2

(1st Embodiment)

f = 102.5 to 291.7    FNO = 4.60 to 5.80

| | Radius of Curvature | | Axial Distance | | Refractive Index | | Abbe Number |
|---|---|---|---|---|---|---|---|
| r1 | 145.908 | | | | | | |
| | | d1 | 2.000 | N1 | 1.68150 | ν1 | 36.64 |
| r2 | 70.684 | | | | | | |
| | | d2 | 0.100 | | | | |
| r3 | 70.684 | | | | | | |
| | | d3 | 7.800 | N2 | 1.49310 | ν2 | 83.58 |
| r4 | −373.180 | | | | | | |
| | | d4 | 0.200 | | | | |
| r5 | 63.681 | | | | | | |
| | | d5 | 4.980 | N3 | 1.49310 | ν3 | 83.58 |
| r6 | 331.659 | | | | | | |
| | | d6 | 4.021 to 36.164 to 56.158 | | | | |
| r7 | −56.449 | | | | | | |
| | | d7 | 2.317 | N4 | 1.71736 | ν4 | 29.42 |
| r8 | −33.333 | | | | | | |
| | | d8 | 1.000 | N5 | 1.71300 | ν5 | 53.93 |
| r9* | 44.535 | | | | | | |
| | | d9 | 2.950 | | | | |
| r10* | 53.342 | | | | | | |
| | | d10 | 3.000 | N6 | 1.76200 | ν6 | 40.36 |
| r11 | −238.454 | | | | | | |
| | | d11 | 30.590 to 9.768 to 1.971 | | | | |
| r12 | ∞ | | | | | | |
| | | d12 | 1.800 | | | | |
| r13 | 84.751 | | | | | | |
| | | d13 | 1.700 | N7 | 1.84666 | ν7 | 23.82 |
| r14 | 32.181 | | | | | | |
| | | d14 | 3.060 | | | | |
| r15 | 56.838 | | | | | | |
| | | d15 | 3.600 | N8 | 1.51680 | ν8 | 64.20 |
| r16 | −115.075 | | | | | | |
| | | d16 | 0.500 | | | | |
| r17 | 39.665 | | | | | | |
| | | d17 | 4.800 | N9 | 1.51680 | ν9 | 64.20 |
| r18 | −51.703 | | | | | | |
| | | d18 | 25.014 to 11.592 to 0.992 | | | | |
| r19 | 479.917 | | | | | | |
| | | d19 | 1.700 | N10 | 1.75450 | ν10 | 51.57 |
| r20 | 30.939 | | | | | | |
| | | d20 | 1.950 | | | | |
| r21 | −295.373 | | | | | | |
| | | d21 | 3.600 | N11 | 1.67339 | ν11 | 29.25 |
| r22 | −22.081 | | | | | | |
| | | d22 | 1.700 | N12 | 1.75450 | ν12 | 51.57 |
| r23 | −2291.843 | | | | | | |

Σd = 108.382 to 106.280 to 107.878

Aspherical Coefficients r9: e = 1.0000
A4 = −0.44877 × 10$^{-5}$
A6 = −0.92231 × 10$^{-8}$
r10: e = 1.0000
A4 = −0.28259 × 10$^{-5}$
A6 = −0.75299 × 10$^{-8}$

TABLE 3

(2nd Embodiment)

f = 102.5 to 292.0    FNO = 6.20 to 4.70

| | Radius of Curvature | | Axial Distance | | Refractive Index | | Abbe Number |
|---|---|---|---|---|---|---|---|
| r1 | 102.431 | | | | | | |
| | | d1 | 2.500 | N1 | 1.84666 | ν1 | 23.83 |
| r2 | 67.342 | | | | | | |
| | | d2 | 0.010 | N2 | 1.51400 | ν2 | 42.83 |

TABLE 3-continued (2nd Embodiment)

| | Radius of Curvature | | Axial Distance | | Refractive Index | | Abbe Number |
|---|---|---|---|---|---|---|---|
| r3 | 67.342 | | | | | | |
| | | d3 | 6.490 | N3 | 1.51680 | v3 | 64.20 |
| r4 | −391.725 | | | | | | |
| | | d4 | 0.200 | | | | |
| r5 | 69.035 | | | | | | |
| | | d5 | 4.600 | N4 | 1.51823 | v4 | 58.96 |
| r6 | 196.318 | | | | | | |
| | | d6 | 4.475 to 39.126 to 56.300 | | | | |
| r7 | −54.803 | | | | | | |
| | | d7 | 1.600 | N5 | 1.71300 | v5 | 53.93 |
| r8 | 49.655 | | | | | | |
| | | d8 | 3.850 | | | | |
| r9 | 625.223 | | | | | | |
| | | d9 | 3.000 | N6 | 1.75520 | v6 | 27.51 |
| r10* | −65.240 | | | | | | |
| | | d10 | 0.600 | | | | |
| r11* | 120.803 | | | | | | |
| | | d11 | 1.517 | N7 | 1.51728 | v7 | 69.43 |
| r12 | 345.996 | | | | | | |
| | | d12 | 27.726 to 11.194 to 0.500 | | | | |
| r13 | ∞ | | | | | | |
| | | d13 | 1.800 | | | | |
| r14 | 101.670 | | | | | | |
| | | d14 | 1.700 | N8 | 1.84666 | v8 | 23.83 |
| r15 | 36.364 | | | | | | |
| | | d15 | 3.060 | | | | |
| r16 | 53.454 | | | | | | |
| | | d16 | 3.600 | N9 | 1.51680 | v9 | 64.20 |
| r17 | −85.227 | | | | | | |
| | | d17 | 0.500 | | | | |
| r18 | 63.240 | | | | | | |
| | | d18 | 4.800 | N10 | 1.51680 | v10 | 64.20 |
| r19 | −44.146 | | | | | | |
| | | d19 | 24.762 to 10.995 to 0.999 | | | | |
| r20 | −543.709 | | | | | | |
| | | d20 | 1.700 | N11 | 1.75450 | v11 | 51.57 |
| r21 | 38.363 | | | | | | |
| | | d21 | 1.950 | | | | |
| r22 | −131.977 | | | | | | |
| | | d22 | 3.590 | N12 | 1.67339 | v12 | 29.25 |
| r23 | −21.846 | | | | | | |
| | | d23 | 0.010 | N13 | 1.51400 | v13 | 42.83 |
| r24 | −21.846 | | | | | | |
| | | d24 | 1.700 | N14 | 1.75450 | v14 | 51.57 |
| r25 | −412.055 | | | | | | |
| | | Σd = 105.740 to 114.099 to 118.873 | | | | | |

Aspherical Coefficients r10: e = 1.0000
A4 = −0.33318 × 10⁻⁵
r11: e = 1.0000
A4 = −0.44033 × 10⁻⁵

TABLE 4

(3rd Embodiment)

f = 295.3   FNO = 2.88

| | Radius of Curvature | | Axial Distance | | Refractive Index | | Abbe Number |
|---|---|---|---|---|---|---|---|
| r1 | 146.791 | | | | | | |
| | | d1 | 16.000 | N1 | 1.49520 | v1 | 79.74 |
| r2 | −627.872 | | | | | | |
| | | d2 | 0.400 | | | | |
| r3 | 131.088 | | | | | | |
| | | d3 | 14.000 | N2 | 1.49520 | v2 | 79.74 |
| r4 | −624.766 | | | | | | |
| | | d4 | 2.000 | | | | |
| r5 | −557.094 | | | | | | |
| | | d5 | 3.500 | N3 | 1.74000 | v3 | 31.72 |
| r6 | 308.127 | | | | | | |
| | | d6 | 78.000 | | | | |
| r7 | −89.990 | | | | | | |
| | | d7 | 1.700 | N4 | 1.66608 | v4 | 47.95 |
| r8 | −245.002 | | | | | | |
| | | d8 | 3.365 | | | | |
| r9 | 625.958 | | | | | | |
| | | d9 | 5.500 | N5 | 1.51680 | v5 | 64.20 |
| r10 | −117.962 | | | | | | |
| | | d10 | 6.000 | | | | |
| r11 | −2511.111 | | | | | | |
| | | d11 | 5.500 | N6 | 1.70055 | v6 | 30.11 |
| r12 | −69.899 | | | | | | |
| | | d12 | 1.500 | N7 | 1.58913 | v7 | 61.11 |
| r13 | 377.175 | | | | | | |
| | | d13 | 3.000 | | | | |
| r14 | −264.704 | | | | | | |
| | | d14 | 3.340 | N8 | 1.66998 | v8 | 39.23 |
| r15 | −100.000 | | | | | | |
| | | d15 | 1.894 | N9 | 1.67790 | v9 | 55.38 |
| r16* | 65.865 | | | | | | |
| | | d16 | 3.000 | | | | |
| r17* | 100.769 | | | | | | |
| | | d17 | 1.500 | N10 | 1.49140 | v10 | 57.82 |
| r18 | 99.255 | | | | | | |
| | | d18 | 10.252 | | | | |
| r19 | ∞ | | | | | | |
| | | d19 | 1.600 | | | | |
| r20 | 370.033 | | | | | | |
| | | d20 | 1.600 | N11 | 1.64769 | v11 | 33.88 |
| r21 | 78.943 | | | | | | |
| | | d21 | 6.000 | N12 | 1.60311 | v12 | 60.74 |
| r22 | −89.239 | | | | | | |
| | | Σd = 169.651 | | | | | |

Aspherical Coefficients r16: e = 1.0000
A4 = −0.55841 × 10⁻⁶
A6 = −0.19718 × 10⁻⁹
r17: e = 1.0000
A4 = −0.70834 × 10⁻⁶
A6 = −0.11493 × 10⁻⁹

TABLE 5

(4th Embodiment)

f = 28.8 to 103.0   FNO = 3.5 to 4.9

| | Radius of Curvature | | Axial Distance | | Refractive Index | | Abbe Number |
|---|---|---|---|---|---|---|---|
| r1 | 150.000 | | | | | | |
| | | d1 | 1.600 | N1 | 1.86074 | v1 | 23.10 |
| r2 | 65.193 | | | | | | |
| | | d2 | 7.500 | N2 | 1.51680 | v2 | 64.10 |
| r3 | −201.063 | | | | | | |
| | | d3 | 0.100 | | | | |
| r4 | 38.552 | | | | | | |
| | | d4 | 4.700 | N3 | 1.67025 | v3 | 57.50 |
| r5 | 92.468 | | | | | | |
| | | d5 | 2.014 to 13.477 to 27.014 | | | | |
| r6* | 50.334 | | | | | | |
| | | d6 | 1.500 | N4 | 1.74443 | v4 | 49.40 |
| r7 | 11.892 | | | | | | |
| | | d7 | 6.000 | | | | |
| r8 | −30.162 | | | | | | |
| | | d8 | 1.200 | N5 | 1.77279 | v5 | 49.40 |
| r9 | 21.082 | | | | | | |
| | | d9 | 2.500 | N6 | 1.86074 | v6 | 23.10 |
| r10 | 89.406 | | | | | | |
| | | d10 | 0.400 | | | | |
| r11 | 26.791 | | | | | | |
| | | d11 | 2.300 | N7 | 1.86074 | v7 | 23.10 |

TABLE 5-continued (4th Embodiment)

| | | | | | | |
|---|---|---|---|---|---|---|
| r12 | 47.408 | | | | | |
| | | d12 | 14.581 to 8.142 to 1.416 | | | |
| r13 | ∞ | | | | | |
| | | d13 | 1.500 | | | |
| r14 | 31.603 | | | | | |
| | | d14 | 4.000 | N8 | 1.50137 | v8 | 56.50 |
| r15 | −56.214 | | | | | |
| | | d15 | 0.100 | | | |
| r16 | 22.191 | | | | | |
| | | d16 | 5.000 | N9 | 1.56384 | v9 | 60.80 |
| r17 | −24.447 | | | | | |
| | | d17 | 2.000 | N10 | 1.80610 | v10 | 33.27 |
| r18 | 39.928 | | | | | |
| | | d18 | 4.500 | | | |
| r19 | ∞ | | | | | |
| | | d19 | 6.093 to 4.215 to 3.065 | | | |
| r20 | 38.981 | | | | | |
| | | d20 | 2.400 | N11F | 1.62041 | v11F | 60.30 |
| r21* | ∞ | | | | | |
| | | d21 | 0.250 | | | |
| r22* | ∞ | | | | | |
| | | d22 | 3.200 | N11R | 1.62041 | v11R | 60.30 |
| r23 | −25.650 | | | | | |
| | | d23 | 2.300 | | | |
| r24* | −27.387 | | | | | |
| | | d24 | 1.800 | N12 | 1.85549 | v12 | 39.90 |
| r25 | −93.762 | | | | | |
| | | Σd = 77.538 to 80.684 to 86.345 | | | | |

Aspherical Coefficients r6 :e = 1.0000
A4 = −0.13550 × 10⁻⁵
A6 = −0.18770 × 10⁻⁷
A8 = −0.52320 × 10⁻¹¹
A10 = −0.72210 × 10⁻¹³
r21: e = 1.0000
A4 = 0.50000 × 10⁻⁵
r22: e = 1.0000
A4 = 0.50000 × 10⁻⁵
r24: e = 1.0000
A4 = −0.21590 × 10⁻⁴
A6 = −0.37690 × 10⁻⁷
A8 = −0.12850 × 10⁻⁹
A10 = 0.43330 × 10⁻¹²

TABLE 6

<<Conditions (1) to (6)>>

| Condition | 1st embodiment | 2nd embodiment | 3rd embodiment | 4th embodiment |
|---|---|---|---|---|
| (1): $\omega$ | 11.9 to 4.2 | 11.9 to 4.2 | 4.2 | 36.9 to 11.8 |
| (2): $\dfrac{D}{f}$ | 0.389 to 0.039 | 0.374 to 0.038 | 0.068 | 0.805 to 0.196 |
| (3): $\dfrac{d_{ASP}}{f_T}$ | 0.01 | 0.002 | 0.01 | 0.002 |
| (4): $\dfrac{\Delta d_{ASP}}{f_T}$ | 0 | 0 | — | 0 |
| (5): $\left|\dfrac{\phi_N}{\phi_A}\right|$ | 0.60 | 0.02 | 0.004 | 1.52 |
| (6): $\left|\dfrac{\phi_A}{\phi_T}\right|$ | 8.45 | 3.72 | 3.83 | 1.64 |

What is claimed is:

1. A lens system comprising:

a compensating lens unit capable of decentering for lens system shake compensation, said compensating lens unit having an aspherical surface;

a non-decentering lens located closer to the image than the compensating lens unit and not decentering in lens system shake compensation, said non-decentering lens having an aspherical surface which has an aspherical effect counteracting that of the aspherical surface of said compensating lens unit; and an aperture stop, wherein the following conditions are fulfilled:

$$\omega \leq 10°$$

$$\frac{D}{f} \leq 0.3$$

$$d_{ASP} < 0.1 x f_T$$

where ω is a half angle of view, D is a distance from the aperture stop to the decentering lens unit, f is a focal length of the entire lens system, $d_{ASP}$ is a distance between two aspherical surfaces and $f_T$ is a focal length of the entire lens system at a longest focal length condition.

2. A lens system as claimed in claim 1, wherein the following condition is fulfilled:

$$\left|\frac{\phi_N}{\phi_A}\right| < 0.35$$

where $\phi_N$ is a power of the non-decentering lens and $\phi_A$ is a power of the compensating lens unit.

3. A lens system as claimed in claim 1, wherein the following condition is fulfilled:

$$1.5 < \left|\frac{\phi_A}{\phi_T}\right| < 12.5$$

where $\phi_T$ is a power of the entire lens system at a longest focal length condition, and $\phi_A$ is a power of the compensating lens unit.

4. A lens system as claimed in claim 1, wherein said compensating lens unit consists of one positive lens element and one negative lens element.

5. A lens system as claimed in claim 4, wherein said positive lens element and said negative lens element are cemented.

6. A lens system comprising:

a compensating lens unit capable of decentering for lens system shake compensation said compensating lens unit having an aspherical surface;

a non-decentering lens located closer to the image than the compensating lens unit and not decentering in lens system shake compensation, said non-decentering, lens having an aspherical surface which has an aspherical effect counteracting that of the aspherical surface of said compensating lens unit; and an aperture stop, wherein the following conditions are fulfilled:

$$\omega < 10°$$

$$\frac{D}{f} \leq 0.3$$

$$\Delta d_{ASP} < 0.08 \times f_T$$

where $\omega$ is a half angle of view, D is a distance from the aperture stop to the decentering lens unit, f is a focal length of the entire lens system, $\Delta d_{ASP}$ is a displacement amount of a distance between two aspherical surfaces, and $f_T$ is a focal length of the entire lens system at a longest focal length condition.

7. A zoom lens system comprising a plurality of lens units and performing zooming by varying distances between the lens units, said zoom lens system comprising:
    a compensating lens unit, located in a lens unit other than the most object side lens unit, capable of decentering for lens system shake compensation, said compensating lens unit having an aspherical surface;
    a non-decentering lens located closer to the image than the compensating lens unit and not decentering in lens system shake compensation, said non-decentering lens having an aspherical surface which has an aspherical effect counteracting that of the aspherical surface of said compensating lens unit, wherein the following condition is fulfilled:

$$d_{ASP} < 0.1 \times f_T$$

where $d_{ASP}$ is a distance between two aspherical surfaces and $f_T$ is a focal length of an entire lens system at a longest focal length condition.

8. A zoom lens system as claimed in claim 7, wherein the following condition is fulfilled:

$$\omega \leq 10°$$

where $\omega$ is a half angle of view.

9. A zoom lens system as claimed in claim 7, further comprising an aperture stop and wherein the following condition is fulfilled:

$$\frac{D}{f} \leq 0.3$$

where D is a distance from the aperture stop to a decentering lens unit, and f is a focal length of an entire lens system.

10. A zoom lens system as claimed in claim 7, wherein the following condition is fulfilled:

$$\left|\frac{\phi_N}{\phi_A}\right| < 0.35$$

where $\phi_N$ is a power of the non-decentering lens and $\phi_A$ is a power of the compensating lens unit.

11. A zoom lens system as claimed in claim 7, wherein the following condition is fulfilled:

$$1.5 < \left|\frac{\phi_A}{\phi_T}\right| < 12.5$$

where $\phi_T$ is a power of an entire lens system at a longest focal length condition, and $\phi_A$ is a power of the compensating lens unit.

12. A zoom lens system as claimed in claim 7, wherein said compensating lens unit consists of one positive lens element and one negative lens element.

13. A zoom lens system as claimed in claim 12, wherein said positive lens element and said negative lens element are cemented.

14. A zoom lens system as claimed in claim 7, wherein the zoom lens system comprises, from an object side, a first lens unit having a positive power, a second lens unit having a negative power, a third lens unit having a positive power, and a fourth lens unit having a negative power, and performs zooming by varying distances between these lens units.

15. A zoom lens system as claimed in claim 14, wherein the compensating lens unit and the non-decentering lens are included in the second lens unit.

16. A zoom lens system as claimed in claim 7, wherein the zoom lens system comprises, from an object side, a first lens unit having a positive power, a second lens unit having a negative power, a third lens unit having a positive power, and a fourth lens unit having a positive power, and performs zooming by varying distances between these lens units.

17. A zoom lens system as claimed in claim 16, wherein the compensating lens unit and the non-decentering lens are included in the fourth lens unit.

18. A zoom lens system comprising:
    a plurality of lens units and performing zooming by varying distances between the lens units, said zoom lens system comprising:
    a compensating lens unit, located in a lens unit other than the most object side lens unit, capable of decentering for lens system shake compensation, said compensating lens unit having an aspherical surface;
    a non-decentering lens located closer to the image than the compensating lens unit and not decentering in lens system shake compensation, said non-decentering lens having an aspherical surface which has an aspherical effect counteracting that of the aspherical surface of said compensating lens unit,
wherein the following condition is fulfilled:

$$\Delta d_{ASP} < 0.08 \times f_T$$

where $\Delta d_{ASP}$ is a displacement amount of a distance between two aspherical surfaces, and $f_T$ is a focal length of the entire lens system at a longest focal length condition.

* * * * *